US006776602B2

(12) United States Patent
Swanson et al.

(10) Patent No.: US 6,776,602 B2
(45) Date of Patent: Aug. 17, 2004

(54) FILAMENT CASSETTE AND LOADING SYSTEM

(75) Inventors: William J. Swanson, St. Paul, MN (US); Minea A. Popa, Roseville, MN (US); Patrick W. Turley, Eden Prairie, MN (US); William R. Priedeman, Jr., Long Lake, MN (US); Paul E. Hopkins, Savage, MN (US); Steve Brose, Belle Plaine, MN (US); Daniel I. Kimm, Leucadia, CA (US); David L. Pollard, Mountain Center, CA (US); Andrew M. Hahn, Anaheim, CA (US)

(73) Assignee: Stratasys, Inc., Eden Prairie, MN (US)

( * ) Notice: Subject to any disclaimer, the term of this patent is extended or adjusted under 35 U.S.C. 154(b) by 415 days.

(21) Appl. No.: 09/804,401

(22) Filed: Feb. 27, 2001

(65) Prior Publication Data

US 2001/0030383 A1 Oct. 18, 2001

Related U.S. Application Data

(63) Continuation-in-part of application No. PCT/US00/17363, filed on Jun. 23, 2000.
(60) Provisional application No. 60/218,642, filed on Jul. 13, 2000, provisional application No. 60/140,613, filed on Jun. 23, 1999, and provisional application No. 60/130,165, filed on Apr. 20, 1999.

(51) Int. Cl.[7] .............................................. B29C 31/00
(52) U.S. Cl. ...................... 425/376.1; 34/380; 206/204; 206/398; 206/403; 226/181; 242/171; 242/563.2; 242/564.4
(58) Field of Search ................................ 206/204, 398, 206/403; 242/171, 564.4, 563.2; 34/380; 226/181, 186; 425/375, 376.1

(56) References Cited

U.S. PATENT DOCUMENTS

| 5,121,329 A | 6/1992 | Crump ........................ 364/468 |
| 6,022,207 A | 2/2000 | Dahlin et al. ............... 425/145 |

Primary Examiner—Robert B. Davis
(74) Attorney, Agent, or Firm—Kinney & Lange, P.A.

(57) ABSTRACT

Disclosed are a filament cassette and a filament loading assembly for supplying filament in a three-dimensional deposition modeling machine. The filament cassette contains a rotatable spool of filament, and has an exit orifice through which a filament strand may exit the cassette. The filament loading assembly is mounted on the modeling machine and receives the filament cassette. The filament loading assembly has conduit for receiving a strand of filament from the cassette and a drive means for advancing the filament strand through the conduit. The filament cassette and loading assembly of the present invention provide a convenient manner of loading and unloading filament from the modeling machine. The filament cassette and the conduit may be made airtight so that the filament is protected from moisture in the environment.

26 Claims, 20 Drawing Sheets

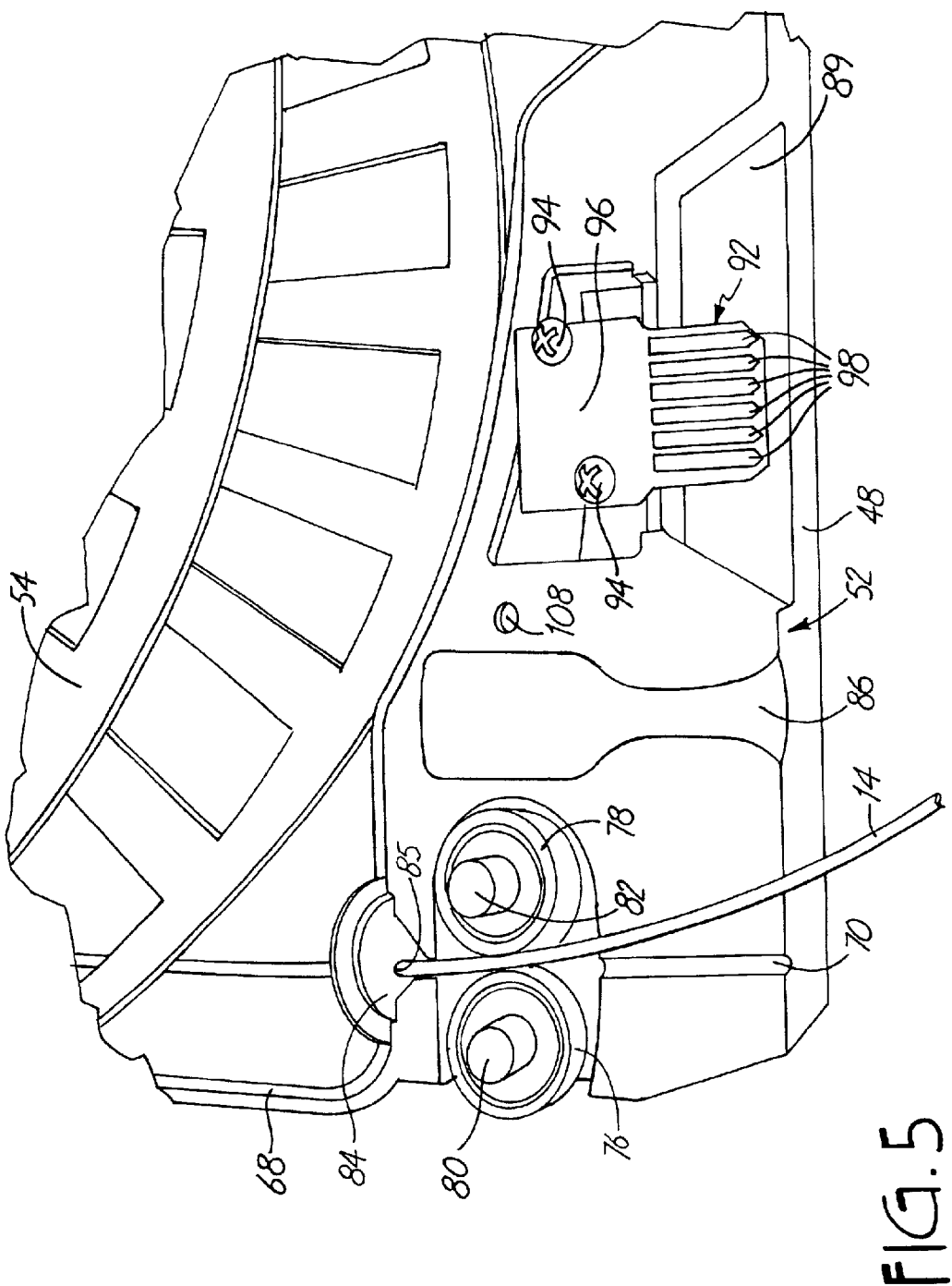

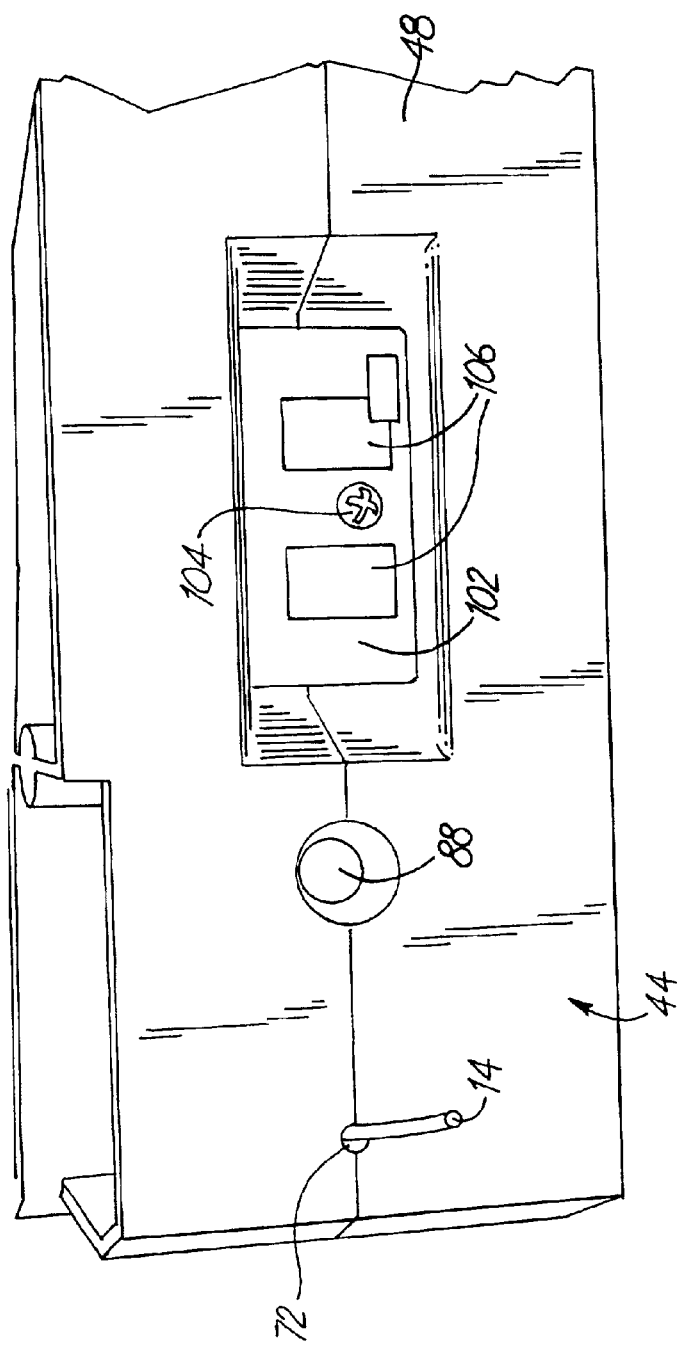

FILAMENT CASSETTE AND LOADING SYSTEM

CROSS-REFERENCE TO RELATED APPLICATION(S)

This application claims priority to provisional application Ser. No. 60/218,642, filed Jul. 13, 2000. This application is also a continuation-in-part of PCT International Application No. US00/17363, filed Jun. 23, 2000 (designating the United States), which is hereby incorporated by reference as it set forth fully herein, and which is a non-provisional of provisional application Serial No. 60/130,165, filed Apr. 20, 1999.

BACKGROUND OF THE INVENTION

This invention relates to the fabrication of three-dimensional objects using extrusion-based layered manufacturing techniques. More particularly, the invention relates to forming three-dimensional objects by extruding solidifiable modeling material in a flowable state in three dimensions with respect to a base, wherein the modeling material is supplied in the form of a filament.

Three-dimensional models are used for functions including aesthetic judgments, proofing the mathematical CAD model, forming hard tooling, studying interference and space allocation, and testing functionality. Extrusion-based layered manufacturing machines build up three-dimensional models by extruding solidifiable modeling material from an extrusion head in a predetermined pattern, based upon design data provided from a computer aided design (CAD) system. A feedstock of either a liquid or solid modeling material is supplied to the extrusion head. One technique is to supply modeling material in the form of a filament strand. Where the feedstock of modeling material is in solid form, a liquifier brings the feedstock to a flowable temperature for deposition.

Examples of extrusion-based apparatus and methods for making three-dimensional objects are described in Valavaara U.S. Pat. No. 4,749,347. Crump U.S. Pat. No. 5,121,329, Crump U.S. Pat. No. 5,340,433, Crump et al. U.S. Pat. No. 5,503,785, Danforth, et al. U.S. Pat. No. 5,900,207, Batchelder, et al. U.S. Pat. No. 5,764,521, Dahlin, et al. U.S. Pat. No. 6,022,207, Stuffle et al. U.S. Pat. No. 6,067,480 and Batchelder, et al. U.S. Pat. No. 6,085,957, all of which are assigned to Stratasys, Inc., the assignee of the present invention.

In the modeling machines employing a filament feed, modeling material is loaded into the machine as a flexible filament wound on a supply reel, such as disclosed in U.S. Pat. No. 5,121,329. A solidifiable material which adheres to the previous layer with an adequate bond upon solidification and which can be supplied as a flexible filament is used as the modeling material. The extrusion head, which includes a liquifier and a dispensing nozzle, receives the filament, melts the filament in the liquifier, and extrudes molten modeling material from the nozzle onto a base contained within a build envelope. The modeling material is extruded layer-by-layer in areas defined from the CAD model. The material being extruded fuses to previously deposited material and solidifies to form a three-dimensional object resembling the CAD model. In building a model from a modeling material that thermally solidifies upon a drop in temperature, the build envelope is preferably a chamber which is heated to a temperature higher than the solidification temperature of the modeling material during deposition, and then gradually cooled to relieve stresses from the material. As disclosed in U.S. Pat. No. 5,866,058, this approach anneals stresses out of the model while is being built so that the finished model is stress free and has very little distortion.

In creating three-dimensional objects by depositing layers of solidifiable material, supporting layers or structures are built underneath overhanging portions or in cavities of objects under construction, which are not supported by the modeling material itself. For example, if the object is a model of the interior of a subterranean cave and the cave prototype is constructed from the floor towards the ceiling, then a stalactite will require a temporary support until the ceiling is completed. A support structure may be built utilizing the same deposition techniques and apparatus by which the modeling material is deposited. The apparatus, under appropriate software control, produces additional geometry acting as a support structure for the overhanging or free-space segments of the object being formed. Support material is deposited either from a separate dispensing head within the modeling apparatus, or by the same dispensing head that deposits modeling material. A support material is chosen that will adhere to the modeling material during construction, and that is removable from a completed object. Various combinations of modeling and support materials are known, such as are disclosed in U.S. Pat. No. 5,503,785.

In Stratasys FDM® three-dimensional modeling machines of the current art which embody a filament feed as disclosed in the above-referenced patents, a coil of modeling filament wrapped on a spool is loaded into the machine by mounting the spool onto a spindle. The filament is made of a thermoplastic or wax material. The user manually feeds a strand of the filament through a guide tube made of low friction material, unwinding filament from the spool until the filament strand reaches a pair of motor-driven feed rollers at the extrusion head. The filament strand is advanced by the feed rollers into a liquifier carried by the extrusion head. Inside the liquifier, the filament is heated to a flowable temperature. As the feed rollers continue to advance filament into the extrusion head, the force of the incoming filament strand extrudes the flowable material out from the dispensing nozzle where it is deposited onto a substrate removably mounted to a build platform. The flow rate of the material extruded from the nozzle is a function of the rate at which the filament is advanced to the head and the size of the dispensing nozzle orifice. A controller controls movement of the extrusion head in a horizontal x, y plane, controls movement of the build platform in a vertical z-direction, and controls the rate at which the feed rollers advance filament into the head. By controlling these processing variables in synchrony, the modeling material is deposited at a desired flow rate in "beads" or "roads" layer-by-layer in areas defined from the CAD model. The dispensed modeling material solidifies upon cooling, to create a three-dimensional solid object.

The Stratasys FDM® modeling machines use modeling filaments which are made from moisture sensitive materials, e.g. ABS thermoplastic. In order for the machines to function properly and to build accurate, robust models, the material must be kept dry. Therefore, filament spools for use in the machines are shipped, together with packets of desiccant, in moisture-impermeable packages. Each filament spool is to remain in its package until it is loaded into a modeling machine. The spindle onto which the spool is mounted is contained in a "drybox", an area of the machine maintained at low humidity conditions. The user is instructed to place the desiccant packets packaged with the filament spool into the drybox, and to remove any desiccant packets placed in the machine with prior spools. After manually feeding the filament to the feed rollers, the user latches a door of the drybox and may instruct the machine to begin building a model. To unload the filament spool from the machine, the user manually winds the filament back onto the spool. U.S. Pat. No. 6,022,207 shows and describes a spool of the current art loaded into the drybox of a three-dimensional modeling machine.

Manually feeding filament to the head, as is presently done, can be tedious. Additionally, as a practical matter, users often leave old desiccant in the drybox and fail to replace it with new desiccant, allowing humidity in the drybox to reach unacceptable levels. Further, frequent switching of spools results in moisture-contaminated material. Opening and closing the drybox door allows humid air to get trapped inside of the sealed area. A partially used spool unloaded from the machine is exposed to moisture and becomes contaminated as well. These moisture contamination problems result in wasted material when the user switches the type or color of modeling material. Moreover, some materials desirable for use as modeling materials in the Stratasys FDM® machines are highly vulnerable to moisture and can get contaminated within minutes. The time during which the drybox door is opened for loading and unloading filament introduces a level of moisture into the drybox unacceptable for some desirable materials, limiting the choice of modeling materials for use in these machines.

It would be desirable to provide modeling filament to a three-dimensional modeling machine in a manner that would simplify the loading and unloading operation, and that would reduce the moisture introduced into the machine. Additionally, it would be desirable to be able to readily remove unused filament from the machine and store it for later use.

BRIEF SUMMARY OF THE INVENTION

The present invention is a filament cassette and a filament loading assembly for supplying modeling filament in a three-dimensional deposition modeling machine. The filament cassette has a chamber which contains a rotatable spool of filament, a filament path which leads from the chamber to an exit orifice, and a means for advancing filament from the spool along the filament path and out of the exit orifice. In a first preferred embodiment, the means for advancing comprises a roller which receives a rotational force from an external drive wheel. In a second preferred embodiment, the means for advancing comprises a roller that is manually operated by a user. The filament cassette may be made airtight to protect moisture sensitive filament from the environment.

The filament cassette receiver is on the modeling machine and comprises a conduit and a drive means. The conduit receives a filament strand provided from the exit orifice of the cassette and guides the filament strand along a filament path of the machine. The drive means advances the filament strand through the conduit in response to control signals from a controller. The filament cassette may be unloaded from the machine by controlling the drive means to wind the filament strand back through the conduit and into the cassette. In a preferred embodiment, the latching means engages and disengages the filament cassette in a loading bay of the modeling machine, to both maintain and allow removal of the cassette. One or more filament loading assemblies may be used in a single modeling machine, each receiving a filament cassette. Where multiple filament loading assemblies are used, filament cassette containing both modeling and support material may be loaded into the machine. Also, some filament cassettes may serve as primary supply cassettes while others serve as standby cassettes.

BRIEF DESCRIPTION OF THE DRAWINGS

FIG. 5 is a detailed view of the (partially) exploded filament cassette shown in FIG. 3, showing a strand of filament in the filament path and a mounted circuit board.

FIG. 5A is a detailed view of an alternative configuration of a circuit board mounted onto the first embodiment of a filament cassette.

DETAILED DESCRIPTION

Figure 1:
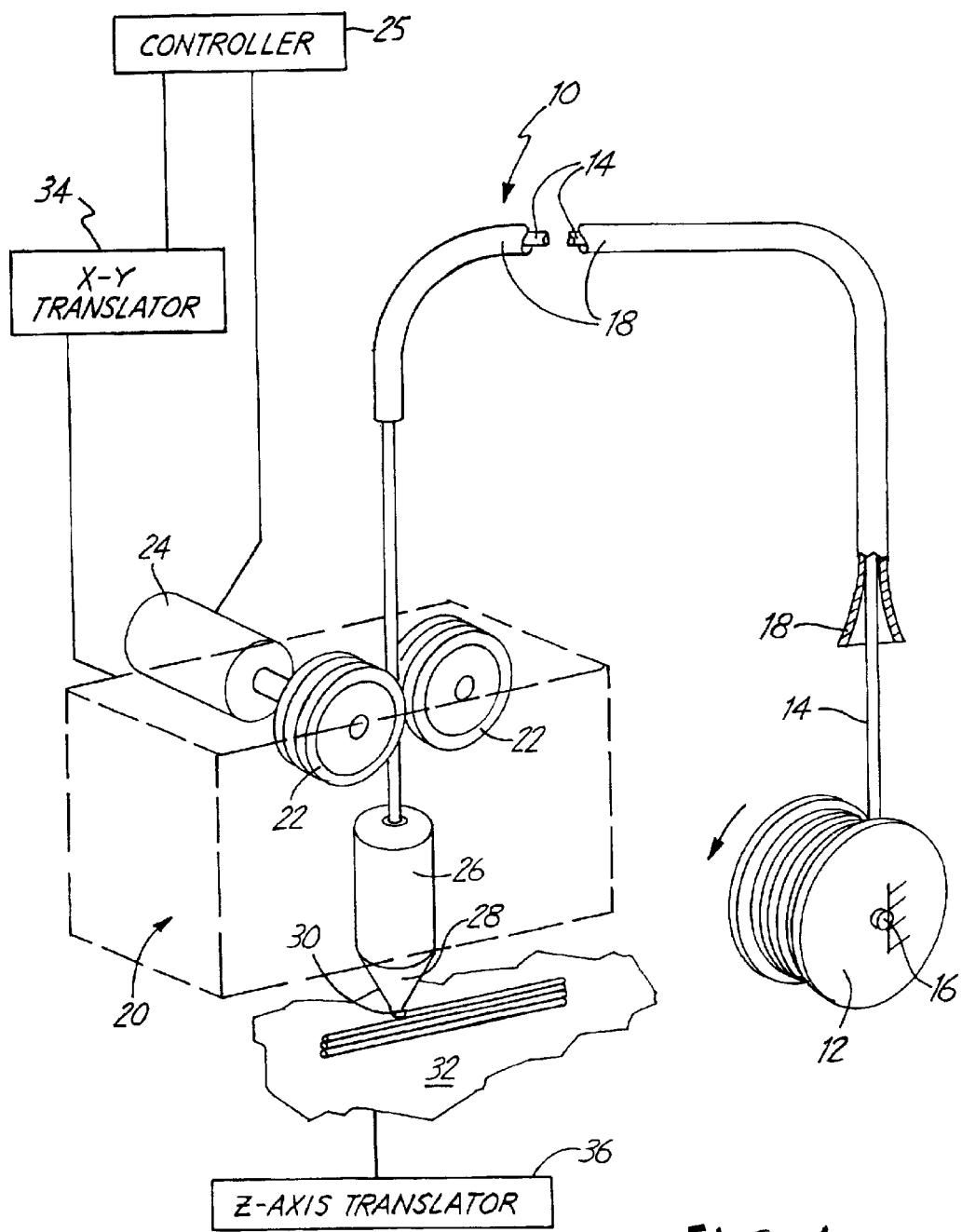
FIG. 1 is a perspective, diagrammatic view of a generic filament-feed used in an extrusion-based three-dimensional modeling machine.

A filament feed 10 used generally to feed filament to an extrusion head 20 in an extrusion-based three-dimensional modeling machine is shown in FIG. 1. A spool 12 carrying a coil of filament 14 is mounted on a spindle 16. The filament 14 is made up of a modeling material from which a three-dimensional model (or a support structure for the three-dimensional model) is to be built. Typically, the filament has a small diameter, such as on the order of 0.070 inches.

A strand of the filament 14 is fed through a guide tube or tubes 18, made of a low-friction material, which also preferably provides a moisture barrier, such as Teflon™. The guide tube 18 routes the strand of filament 14 to the extrusion head 20. A pair of feed rollers 22, shown mounted on the extrusion head 20, receive the strand of filament 14 and feed the strand of filament 14 to a liquifier 26 carried by the extrusion head 20. As shown, the feed rollers 22 are rubber-coated so as to grab the strand of filament 14 therebetween. Also as shown, one of feed rollers 22 is a drive roller, driven by a motor 24 under the control of a controller 25. The other roller 22 is an idler roller. The liquifier 26 is heated so as to melt the filament 14. The liquifier 26 terminates in a nozzle 28 having a discharge orifice 30 for dispensing the molten modeling material. The liquifier 26 is pressurized by the "pumping" of the strand of filament 14 into the liquifier 26 by feed rollers 22. The strand of filament itself acts as a piston, creating a "liquifier pump". The pressurization impels the molten modeling material out of the orifice 30 at a volumetric flow rate. The volumetric flow rate is a function of the size of the dispensing orifice 30 and the rate of rotation of the feed rollers 22. By selective control of the motor 24, the rate of advancement of the strand of filament 14, and thus the volumetric dispensing rate of the molten modeling material, can be closely controlled.

The extrusion head 20 is driven in a horizontal x,y plane by an x-y translator 34, which receives drive signals from the controller 25 in accordance with design data derived from a CAD model. As the extrusion head 20 is translated in the x-y plane, molten modeling material is controllably dispensed from the orifice 30 layer-by-layer onto a planar base 32 (shown in part in FIG. 1). After each layer is dispensed, the base 32 is lowered a predetermined increment along a vertical z-axis by a z-axis translator 36, which also receives drive signals from the controller 25. The dispensed material fuses and solidifies to form a three-dimensional object resembling the CAD model. Support material may be dispensed in a like fashion in coordination with the dispensing of modeling material, to build up supporting layers or a support structure for the object.

As will be understood by those in the art, many variations of the modeling machine and process are possible. For example, any relative movement in three-dimensions between the extrusion head 20 and the base 32 may be used to built up the object. The feed rollers and the motor may take various forms. For example, as is disclosed in U.S. Pat. No. 5,121,329, both rollers may be driven (such as by coupling the rollers by a timing belt), more rollers be added, or the rollers may be spring-biased towards each other, rather than rubber coated, to maintain gripping frictional contact on the filament. Any type of motor that can drive the feed rollers at a controlled rate may be employed, for instance a servo motor or a stepper motor. Likewise, different arrangements of extrusion heads may be utilized for receiving and dispensing different types or colors of filament from separate filament feeds. For example, the extrusion head may carry two sets of feed rollers, each driven by its own motor, for advancing two different filament strands from two different spools, such is disclosed in U.S. Pat. Nos. 5,121,329; 5,503,785; and 6,004,124.

Embodiment One

Figure 2:
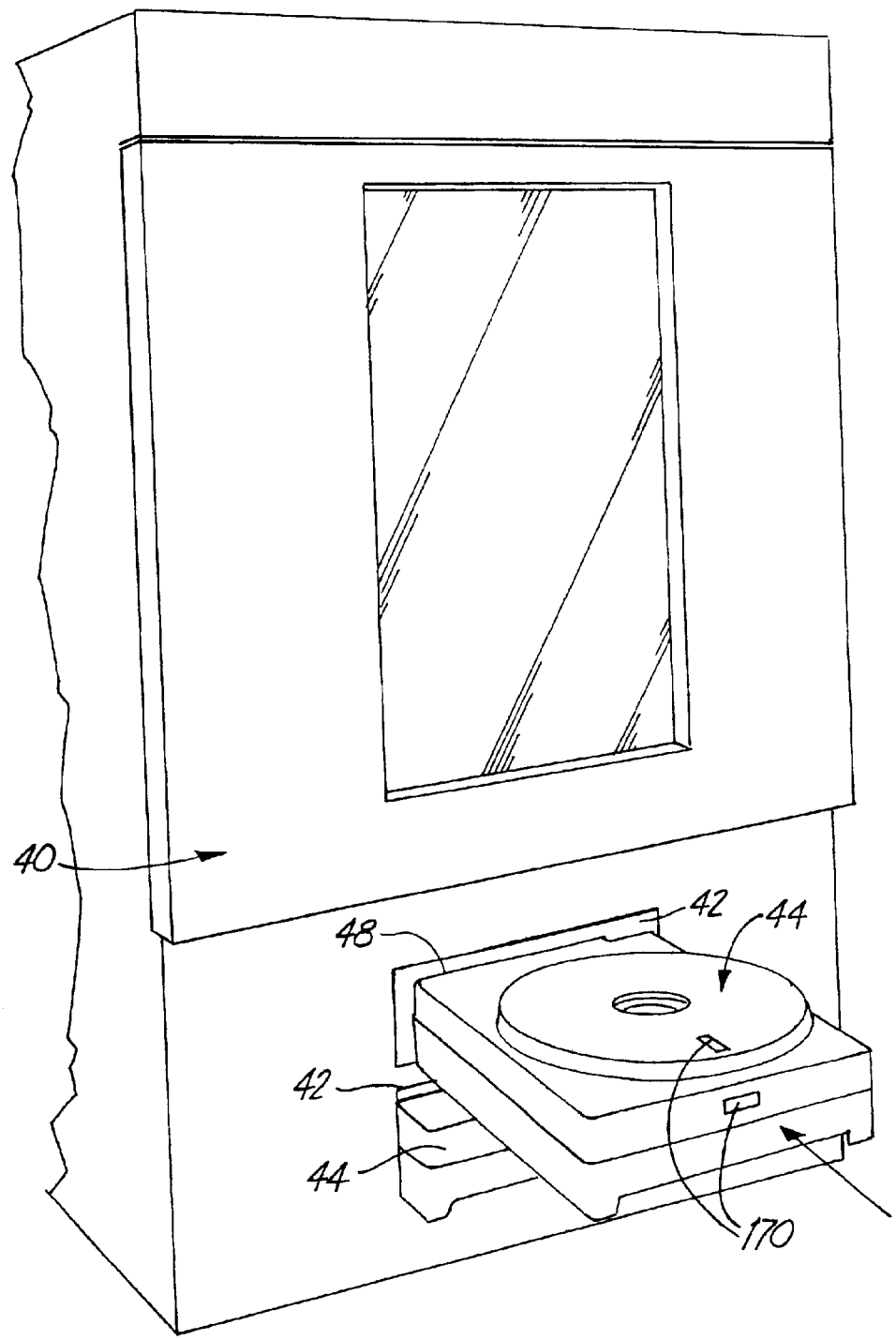
FIG. 2 shows a first embodiment of a filament cassette being loaded into a first embodiment of a three-dimensional modeling machine.

In the present invention, the spool carrying a coil of filament is contained within a filament cassette. FIG. 2 shows a first exemplary embodiment of a modeling machine 40 which has two loading bays 42 stacked vertically, each for receiving a first embodiment of a filament cassette 44. As shown, one filament cassette 44 is loaded into the lower loading bay. A second cassette 44 is being loaded into the upper loading bay 42. Each filament cassette contains a spool carrying a coil of filament. Preferably, one cassette 44 supplies filament formed of modeling material, while the other cassette 44 supplies filament formed of support material. The modeling machine 40 has two liquifiers 26, such as shown in FIG. 1, which each receive a strand of filament from one of the cassettes 44.

As will be described in detail below, each loading bay 42 contains a cassette receiver 46 which engages the filament cassette 44 and advances a strand of the filament 14 from the cassette 44 into the guide tube 18 of filament feed 10. A user loads the filament cassette 44 into the modeling machine 40 by holding the cassette 44 in an upright position and lining up a leading edge 48 of the cassette 44 with one of the loading bays 42. The user pushes the cassette 44 into the loading bay 42 until a hard stop is reached. At such time, the cassette 44 is engaged by the cassette receiver 46.

Figure 3:
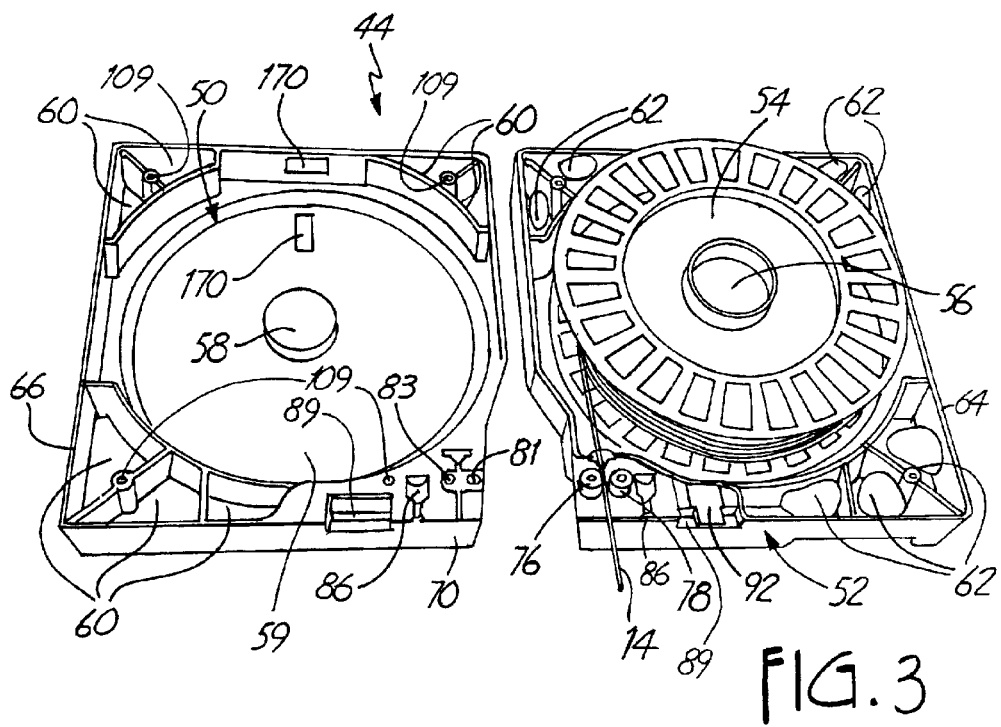
FIG. 3 is a partially exploded view of the first embodiment of a filament cassette.
Figure 4:
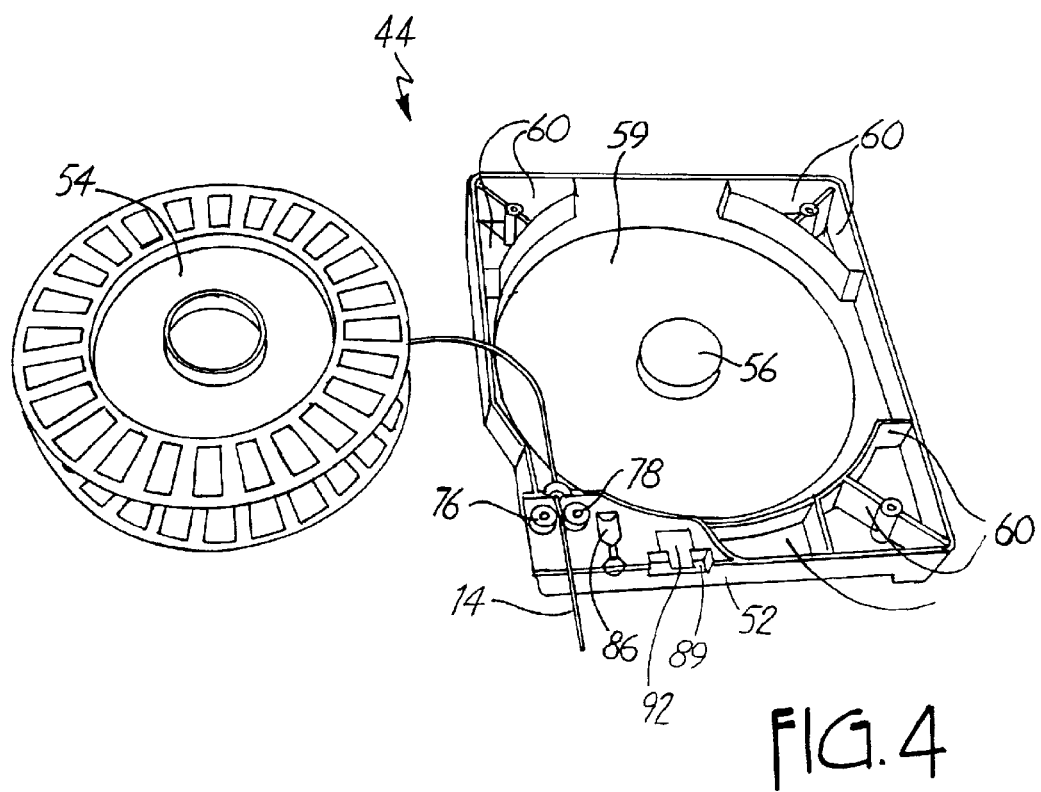
FIG. 4 is an exploded view of the spool and lower shell of the filament cassette shown in FIG. 3.

Detail of the filament cassette 44 is shown in FIGS. 3–7. As shown in FIGS. 3 and 4, the filament cassette 44 is comprised of an upper shell 50, a tower shell 52, and a spool 54 carrying the filament 14. The upper shell 50 and lower shell 52 fasten together, with the spool 54 between them, by a set of four screws 55 (not shown). The lower shell 52 has a hub 56 and the upper shell 50 has a hub 58. A circular recess 59 within upper shell 50 and lower shell 52 surrounds each of hubs 56 and 58. The upper shell 50 and lower shell 52 each have seven compartments 60 along the periphery of the recess 59. Together, hubs 56 and 58 form a spindle on which the spool 54 rotates within a chamber defined by the circular recesses 59. Packets of desiccant 62 are placed in the compartments 60 so as to maintain dry conditions in the chamber of cassette 44. A narrow channel 64 is routed in lower shell 52 in a closed-loop around the periphery of the circular recesses 59 and the compartments 60. A gasket 68 is seated in the channel 64, and a ridge 66 in the upper shell 50 mirrors the channel 64. The gasket 68 blocks air from reaching the spool 54 within the cassette 44 when the upper shell 50 and the lower shell 52 are fastened together.

Figure 7:
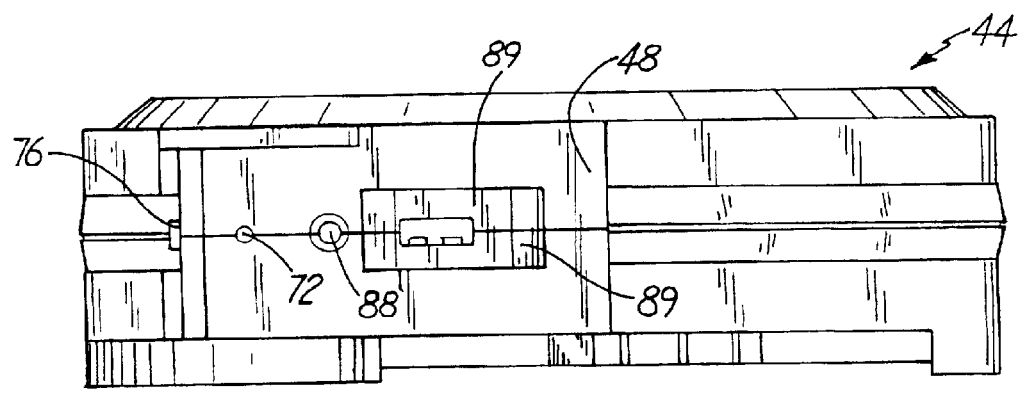
FIG. 7 is a front elevation of the first embodiment of the filament cassette.

Each of shells 50 and 52 have a narrow channel 70 leading from the circular recess 59 to the leading edge 48 of the cassette 44, as best shown in FIG. 5. Together, the channels 70 define a filament path which terminates in an exit orifice 72 of the cassette 44, as shown in FIG. 7. As is best shown in FIG. 5, a roller 76 is mounted opposite a roller 78 along the channel 70 of the lower shell 52. As shown, roller 76 rotates on a floating axle 80, while roller 78 rotates on a fixed axle 82. The floating axle 80 is seated in an oblong depression 81 of the upper and lower shells 50 and 52, oriented perpendicular to the filament path. The fixed axle 82 is seated in a cylindrical depression 83 of the upper and lower shells 50 and 52. A force applied against roller 76 will force roller 76 towards roller 78 to grip a strand of filament 14 in the filament path. Alternatively, both rollers could have a fixed axle, and be positioned close enough to one another to grip a filament strand in the path. The rollers may have an elastomeric surface, to aid in gripping the strand of filament 14.

The channel 70 of lower shell 52 forming the filament path crosses the channel 64 at a position located between the circular recess 59 and the roller pair 76 and 78. A retainer 84, which is integral with the gasket 68, is positioned at this location. The retainer 84 has a center hole 85 of a diameter approximately equal to the filament diameter.

Each of shells 50 and 52 have another channel 86 which runs parallel to the channel 70. Together, the channels 86 define a registration pin receiving cavity 88, which begins at the leading edge 48 of the cassette 44 and terminates before reaching the gasket 68. Cavity 88 has a flared mouth followed by a narrow neck. The mouth of cavity 88 is shown in FIG. 7. Each of upper shell 50 and lower shell 52 have a recess 89 to the right of the channel 86, which together form a recess in the leading edge 48 of the cassette 44. On the lower shell 52, a circuit board is mounted in the recess 89.

In one embodiment, as shown in FIG. 5, a circuit board 92 is mounted horizontally at the base of the recess 89 by two screws 94, and carries an EEPROM 96 on its upper surface. The circuit board 92 has conductive tabs 98 on a portion thereof which extends across the recess 89, so that it may be received by a card-edge connector. In an alternative embodiment, shown in FIG. 5A, a circuit board 102 is mounted vertically in the recess 89 by screws 104. The circuit board 102 has an inner face (not shown) which carries the EEPROM 96 and an outer face which carries a pair of electrical contacts 106.

The EEPROM 96 acts as an electronic tag for the cassette 44. The EEPROM 96 contains information identifying the cassette 44 and the filament 14, such as the type of material from which the filament is formed. The EEPROM 96 additionally may keep a count of the lineal feet of filament 14 that is in the cassette 44. When the cassette 44 is loaded into the modeling machine 40, the EEPROM 96 is electrically connected to the controller 25, as described below. As filament 14 is advanced from the cassette 44 into the modeling machine 40, the controller 25 continually updates the lineal feet count of the filament 14 remaining in the cassette 44. This allows the controller 25 to prevent the machine 40 from attempting to model without filament. EEPROM 96 may be any electronically readable and writeable data store. The use of such a data store as a filament tag is described in U.S. Pat. No. 5,939,008.

The filament cassette 44 is assembled by placing the spool 54 carrying the filament 14 on the hub 56 of the lower shell 52. The lower shell 52 is prepared by pressing the gasket 68 into the channel 64, so that the center hole 85 of the retainer is aligned in the channel 70. One of the circuit boards 92 or 102 is fastened to the lower shell 52. The fixed axle 82 carrying roller 78 is placed into the cylindrical depression 82 of the lower shell 52, while the floating axle 80 carrying roller 76 is placed into the oblong depression 81 of the lower shell 52. A strand of the filament 14 from the spool 54 is threaded through the hole in retainer 84, and placed in the channel 70 of lower shell 52 between the rollers 76 and 78. A packet of desiccant is placed in each of the compartments 60. Once each of these items are in position on the lower shell 52, the upper shell 50 and lower shell 52 are fastened together by the four screws 55 (alternatively, any known fastening device could be used). The screws 55 are set into four screw holes 108 of the lower shell 52, and extend into four threaded screw holes 109 of the upper shell 50. The cassette 44 is then ready for loading into the modeling machine 40.

Once the cassette 44 is assembled, it may be placed in a moisture-impermeable package, which package may then be vacuum sealed, for shipping or later use. Vacuum sealing is desirable where the filament 14 is made from a moisture sensitive material. Additionally, for moisture sensitive materials, the chamber of the cassette 44 containing the spooled filament should be dried just prior to the vacuum sealing. The cassette 44 then remains in the package until a user is ready to load the cassette 44 into the modeling machine 40.

After the filament 14 contained within the cassette 44 is depleted or otherwise becomes unusable, the cassette 44 can be refilled and reused by detaching the shells 50 and 52 and replacing the filament 14 on the spool 54. The EEPROM 96 carried by circuit board 92 or 102 can be reset or the circuit board replaced to provide a new EEPROM 96.

Figure 6:
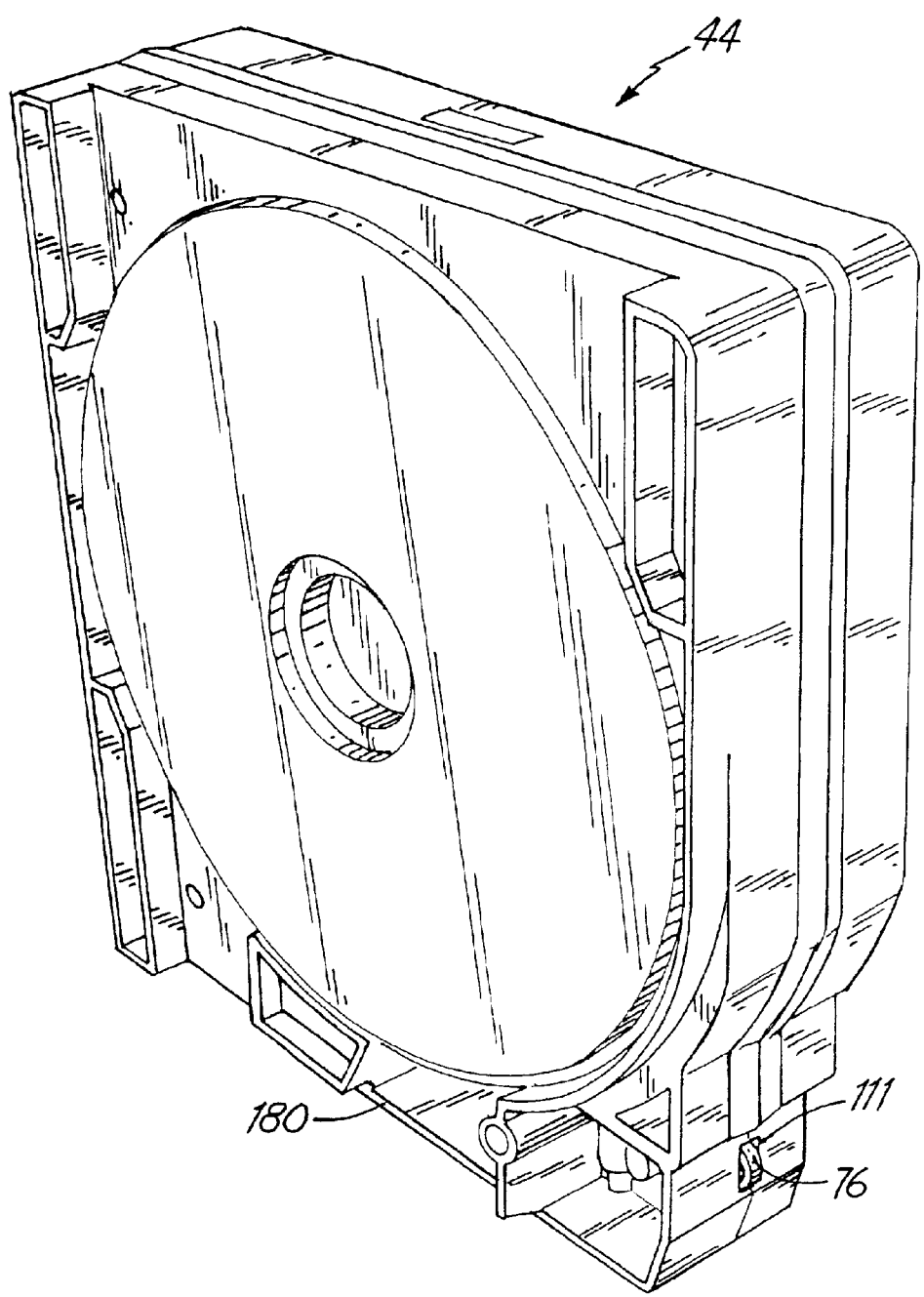
FIG. 6 is a perspective view of the first embodiment of the filament cassette, showing the bottom surface, side and trailing edge of the cassette.

FIG. 6 shows the bottom surface, trailing edge and right side of filament cassette 44. As shown, the roller 76 protrudes from an opening 111 in the right side of the cassette 44 so that it may receive an external rotational force. As will be described in more detail below, the roller 76 is preferably driven by a drive wheel 156 on the cassette receiver 46 to advance the strand of filament 14 out of the exit orifice 72.

The cassette receiver 46 which engages filament cassette 44 is shown in FIGS. 8–12. The cassette receiver 46 is mounted on the floor 110 of each loading bay 42. Preferably, the loading bay floor 110 is made of sheet metal. The cassette receiver 46 comprises a latching mechanism 112, a reciprocating assembly 114 and a drive assembly 116. The latching mechanism 112 is mounted to the floor 110 by a bracket 116. The latching mechanism 112 is comprised of a solenoid 118, an arm 120 and a latch 122. The arm 120 is coupled to the solenoid 118 at one end thereof and is integral with the latch 122 at the other end thereof. The arm 120 extends downward from the solenoid 118 through an opening in the floor 110, sits below and generally parallel to the floor 110, and then angles upward so that it will pivot to position the latch 122 alternately above and below the floor 110. The latch 122 moves up and down through a cutout 124 in the floor 110.

The solenoid 118, operating under control of the controller 25, alternately rocks the arm 120 up and down to engage and disengage the latch 122. When the solenoid 118 is energized, the arm 120 rocks upward at the latch end, placing the latch 122 in an engaged position. When the solenoid 118 is de-energized, the latch end of arm 120 rocks downward, moving the latch 122 to a disengaged position.

The reciprocating assembly 114 is fastened to the loading bay floor 110 by a bracket 126. The reciprocating assembly 114 comprises a piston 128, an ejection spring 130, a track 132 and a frame 133. The piston 128 sits parallel to and above the floor 110. The piston 128 extends through a hole in the bracket 126 and moves forward and back in the loading bay 42, guided by track 130. The forward end of the piston 128 is coupled to the frame 133, which extends generally perpendicular to the piston 128. The frame 133 moves back and forth with the motion of piston 128. The ejection spring 130 is coiled around the piston 128, connecting to the bracket 126 at the rearward end thereof and connecting to the frame 133 at the forward end thereof. A horizontal force applied against the frame 133 will compress the ejection spring 130. When said force is released, the spring 130 will decompress, causing the frame 133 and piston 128 to move forward. A pair of bearings 134 are mounted to the floor 110 underneath the frame 133. The bearings 134 provide a low friction surface which supports flame 133 in a plane parallel to the floor 110, while allowing the frame 133 to slide back and forth.

Attached to the frame 133 are an electrical connector 136, a registration pin 138 and a conduit 140. The electrical connector 136 is configured to mate with the circuit board of the filament cassette 44 on a forward face thereof and is configured to provide an electrical connection to the controller 25 at a rear face thereof. As shown, the forward face of electrical connector 136 carries two pogo pins 142 configured to mate with the electrical contacts 106 of circuit board 102 carried by the cassette 44. (Alternatively, the electrical connector could be a card-edge connector for receiving the conductive tabs 98 of circuit board 92). The registration pin 138 is mounted on the frame 133 to the right of the electrical connector 136. The registration pin 138 extends forward in the loading bay 42 and has a diameter approximately equal to the diameter of the neck of cavity 88 within the filament cassette 44. The conduit 140 is located to the right of the registration pin 138. The conduit 140 has an entrance 144 which faces forward in the loading bay 42, and an exit 146 facing to the rear of the loading bay 42. The entrance 144 of the conduit 140 is configured to align with the exit orifice 72 of the cassette 44, and to receive the strand of filament 14 from the exit orifice 72. Optionally, the conduit 140 may make an airtight seal with the exit orifice 72 and the guide tube 18. A strand of the filament 14 fed into the conduit entrance 144 will exit through the conduit exit 146 where it can then be provided into the guide tube 18 and routed to the liquifier 26.

The drive assembly 116 is mounted to the loading bay floor 110 by a bracket 148. The drive assembly 116 comprises a solenoid 150, a motor 152, a gear train 154, a drive wheel 156 which rotates on a shaft 158, and a housing 160. The drive assembly 116 is shown in detail in FIGS. 10–12. The solenoid 150 having an actuator 162 is mounted in the bracket 148 so that the actuator 162 reciprocates forward and back in the loading bay 42. Energization of the solenoid 150 is controlled by the controller 25. The actuator 162 moves forward in the loading bay 42 when the solenoid 150 is actuated, and moves towards the back of the loading bay 42 when the solenoid 150 is deactuated. The housing 160, which carries the motor 152, the gear train 154 and the drive wheel 156, is pivotably mounted onto the floor 110 in front of the actuator 162. When the solenoid 150 is energized, the actuator 162 pivots the housing 160 in a clockwise rotation. Absent a force imparted against the housing 116 by the actuator 162, the housing 160 is in an upward resting position. When the actuator 162 rotates the housing 116 in a counterclockwise direction, the drive wheel 156 is placed in an actuated position at which it will press against the floating-axis roller 76 of the cassette 44 when the cassette 44 is loaded in the loading bay 42.

Figure 10:
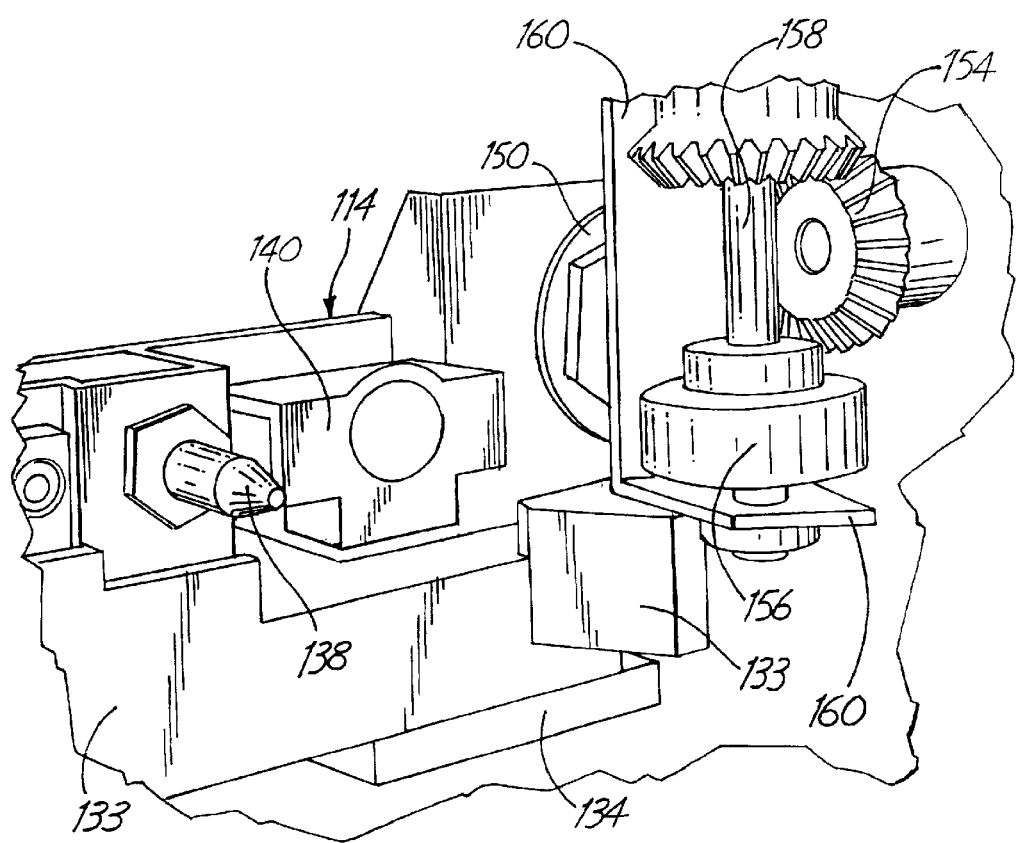
FIG. 10 is a perspective, detailed view of the filament drive shown in FIG. 8 as part of the filament cassette receiver.
Figure 11A:
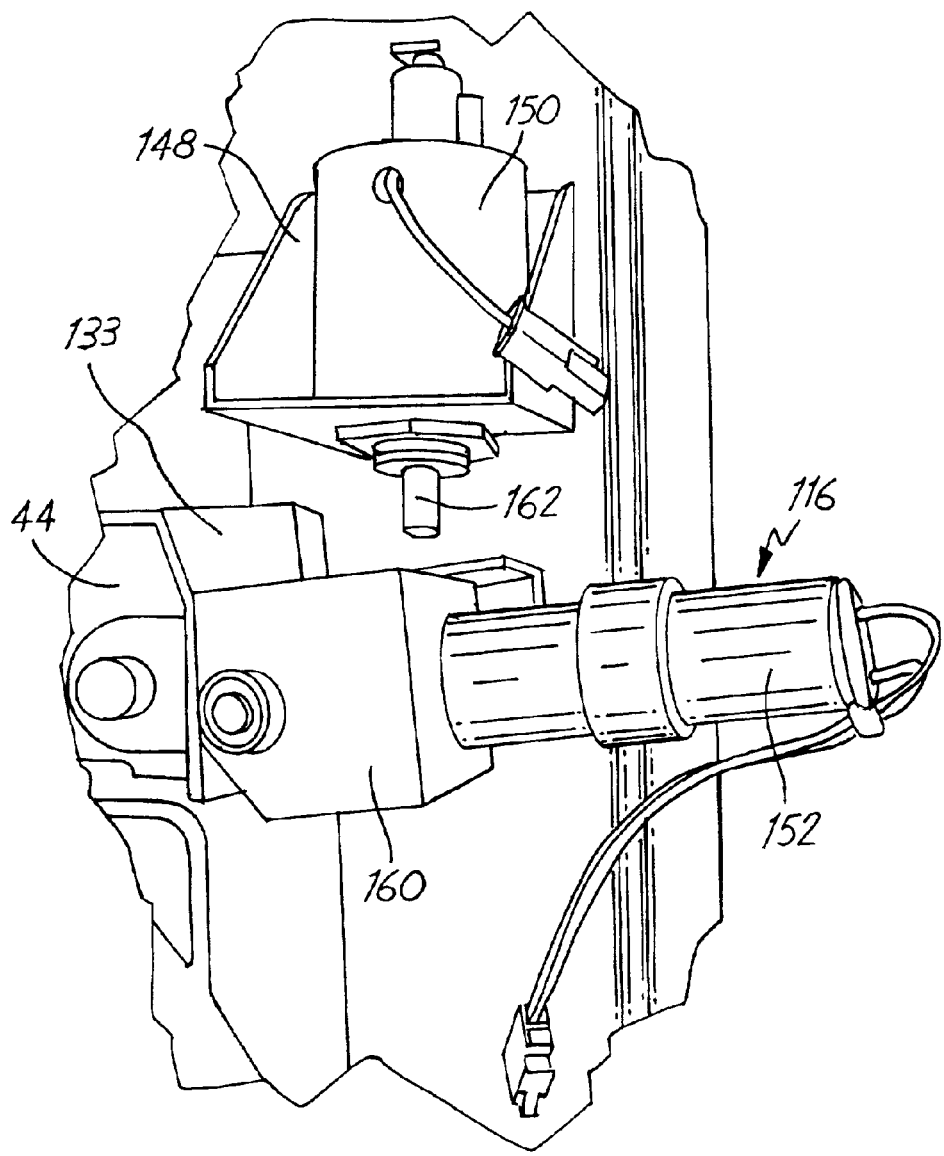
FIG. 11A is a top plan view of the first embodiment of a filament cassette loaded into the filament cassette receiver of FIG. 8, showing the filament drive assembly in a disengaged position.
Figure 11B:
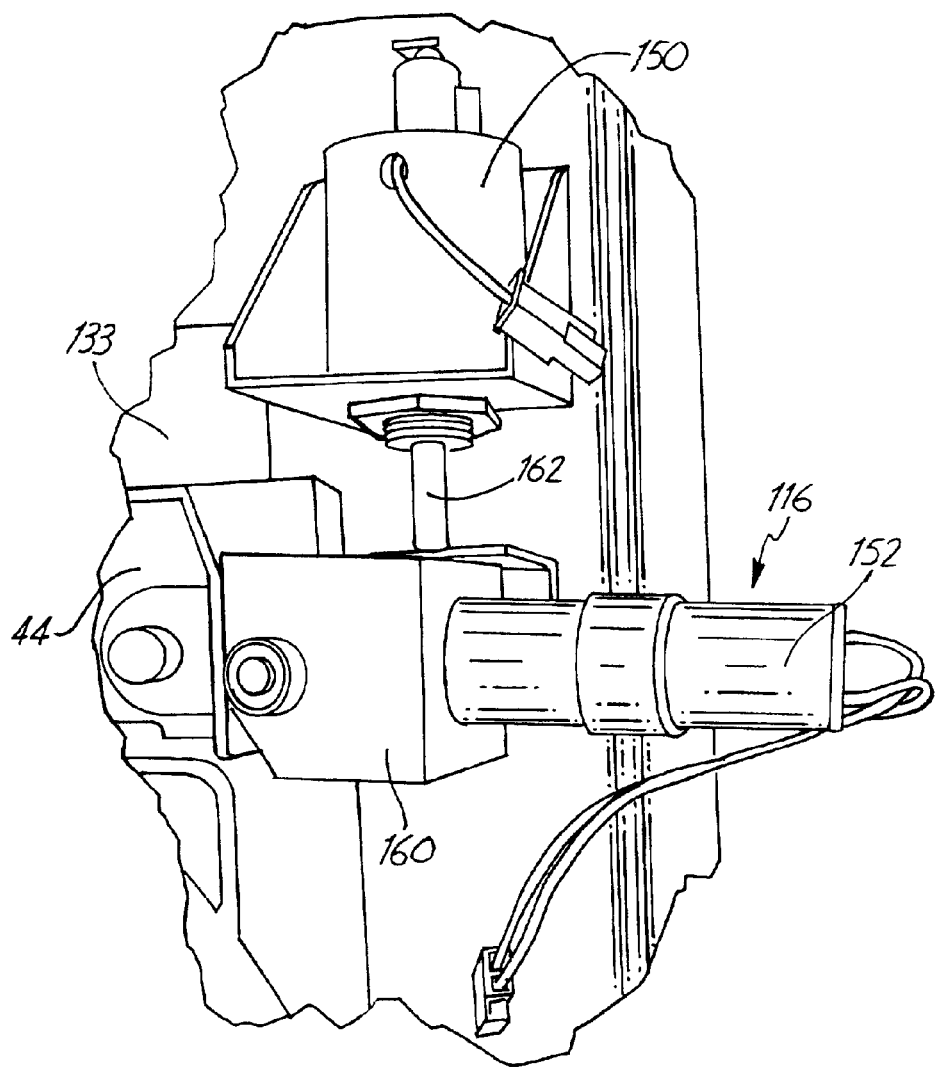
FIG. 11B is a top plan view of a filament cassette loaded into the cassette receiver of FIG. 6, showing the filament drive assembly in an engaged position.
Figure 12:
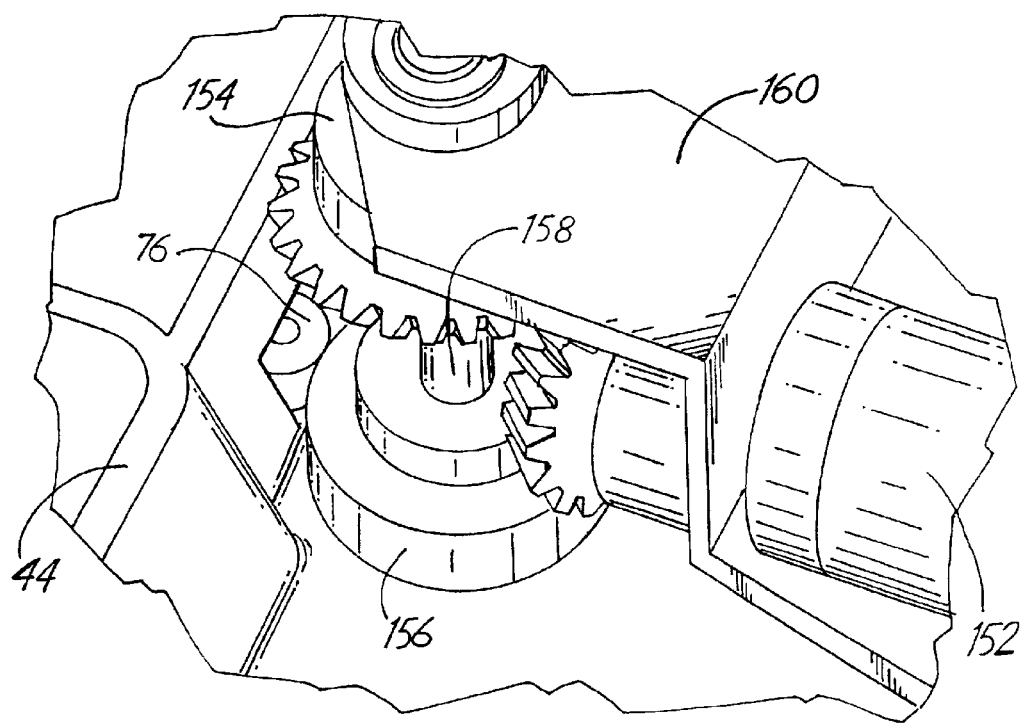
FIG. 12 is a perspective detailed view of the filament drive assembly of FIG. 11B engaging a roller on the first embodiment of the filament cassette.

The motor 152, in response to control signals from the controller 25, causes rotation of the shaft 158 via gear trail 154, as best shown in FIG. 10. Rotation of the shaft 158 rotates the drive wheel 156. When in its actuated position, the drive wheel 156 will then rotate the cassette roller 76. Release of the actuator 162 from the housing 160 allows the housing 160 to rotate back into a resting position. In an alternative embodiment wherein the cassette roller has a fixed axis, the solenoid 150 could be eliminated and the drive wheel 156 could remain fixed in the actuated position where it would impart a constant force against the cassette roller.

Figure 8:
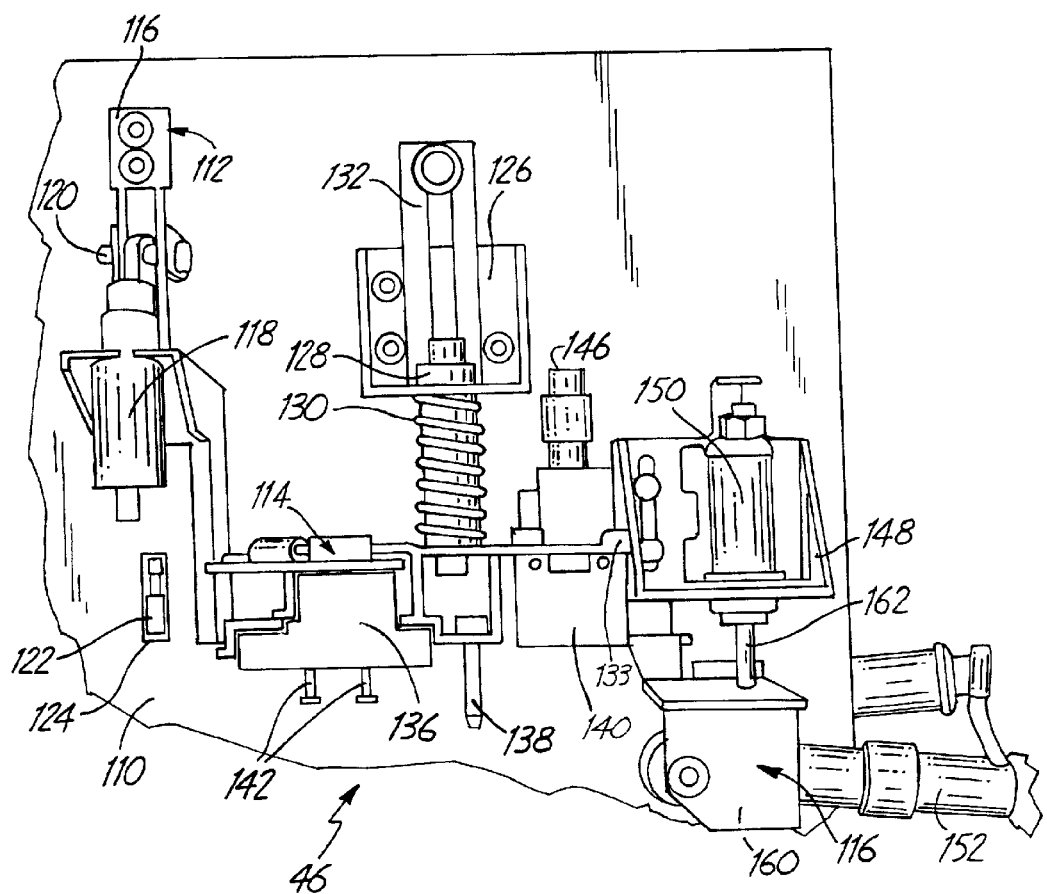
FIG. 8 is top plan view of a first embodiment of a filament cassette receiver of the present invention.
Figure 9:
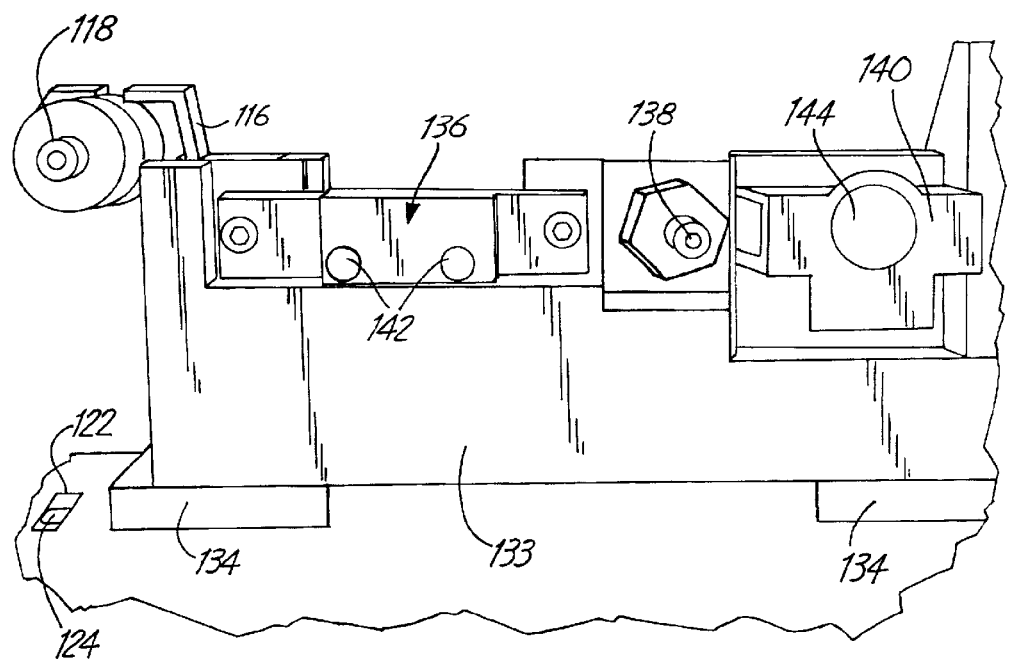
FIG. 9 is a front elevation of the first embodiment of the filament cassette receiver.

As mentioned above, a user loads the cassette 44 into the modeling machine 40 by pushing the cassette 44 into one of the loading bays 42 until a hard stop is reached. The hard stop is provided by a backstop 164, which is mounted to the loading bay floor 110 (as shown in FIG. 8), and the compression of the ejection spring 130. As the user releases the cassette 44, it moves back until the latch 122 catches on a ridge 180 on the bottom surface of the cassette 44 (shown in FIG. 6). The latch 122 is set in an upward position prior to loading the cassette 44, under commands from the controller 25 to the solenoid 118, so that it is ready to catch the cassette 44. The latch 122 remains in this upward position until the user desires to remove the cassette 44, at which time the controller 25 de-energizes the solenoid 118 to lower the latch 122.

As the cassette 44 is pushed into the loading bay 42, the registration pin 138 slides into the cavity 88 of the cassette 44. The registration pin 138 serves to properly align the cassette 44 with the cassette receiver 46, and specifically to counteract a torque imparted against the cassette 44 by engagement of the drive system 116. With the cassette 44 properly aligned with the cassette receiver 46, the pogo pins 142 mate with the electrical contacts 106 of the circuit board 102. Electrical contact is then established between the cassette 44 and the controller 25. The controller 25 knows that the cassette 44 is loaded when it senses that the EEPROM 96 is present. The controller 25 reads the count that is stored on the EEPROM 96. If the count indicates that the amount of filament 14 contained in the cassette 44 is below a set "cassette empty" threshold value, the user is alerted to load a new cassette 44.

When the controller 25 senses that the cassette 44 is loaded, it energizes the solenoid 150 of the drive assembly 116. As described above, actuation of the solenoid 150 rotates the housing 160 such that the drive wheel 156 moves to its actuated position, at which it presses against the roller 76 of the cassette 44. The drive wheel 156 imparts a force against the roller 76, pushing the roller 76 towards the roller 78, thus pinching the strand of filament 14 that is in the filament path. When the drive wheel 156 is driven in a counterclockwise rotation by the motor 152, the roller 76 is driven in a clockwise rotation so as to advance the strand of filament 14 into the conduit 140 and then into the guide tube 18.

The cassette receiver 46 continues to advance the strand of filament 14 until it reaches the feed rollers 22. The controller 25 senses presence of the filament 14 at the feed rollers 22. Preferably, motor 24 is a DC servo motor, and the sensing is achieved by monitoring the current load of the motor 24. To monitor the current load, the controller 25 activates the motor 24 at the start of the auto-load process. When filament is present between the rollers 22, the current load will increase. When the controller 25 senses the increase in motor current load, the controller 25 signals the motor 24 and the cassette receiver 46 to stop. Additionally, the controller 25 de-energizes the solenoid 150 to remove the force of drive wheel 156 against the roller 76. This serves to remove the frictional force of the rollers from the filament 14 during modeling. Filament 14 from each of the cassettes 44 is loaded in a like manner. Once both materials have been loaded, modeling may begin.

Optionally, as mentioned above, the drive assembly 116 could be designed so that the drive wheel 156 remains in a fixed position where it applies a constant force. In such an arrangement, it would be possible to eliminate the roller pair 22, and instead use the roller pair on the cassette 44 to feed the filament 14 into the liquifier 26. Then, the drive wheel 156 would be driven at a controlled rate to control the rate of advancement of the filament 14 into the liquifier 26.

To unload the filament, a controller 25 drives the motor 24 backwards for a short time sufficient to pull the strand of filament 14 out of the liquifier 26 and feed rollers 22. The controller 25 then disengages the cassette receiver 46 from the cassette 44, allowing the user to remove the cassette 44 from the loading bay 42. To eject the cassette 44 from the machine 40, the user pushes the cassette 44 to the hardstop to allow disengagement of the latch 122. The spring 130 then forces forward the reciprocating assembly 114, ejecting the cassette 44.

The top surface and trailing edge of cassette 44 each have a window 170 which allow the user to visually inspect the amount of filament 14 contained within the cassette 44 when the cassette 44 is loaded or unloaded. If a useable amount of filament 14 remains in the cassette 44 when it is removed from the loading bay 42, the cassette can be stored for later use. If there is not a usable amount of filament remaining, the cassette 44 can be refilled and reused.

Embodiment Two

Figure 13:
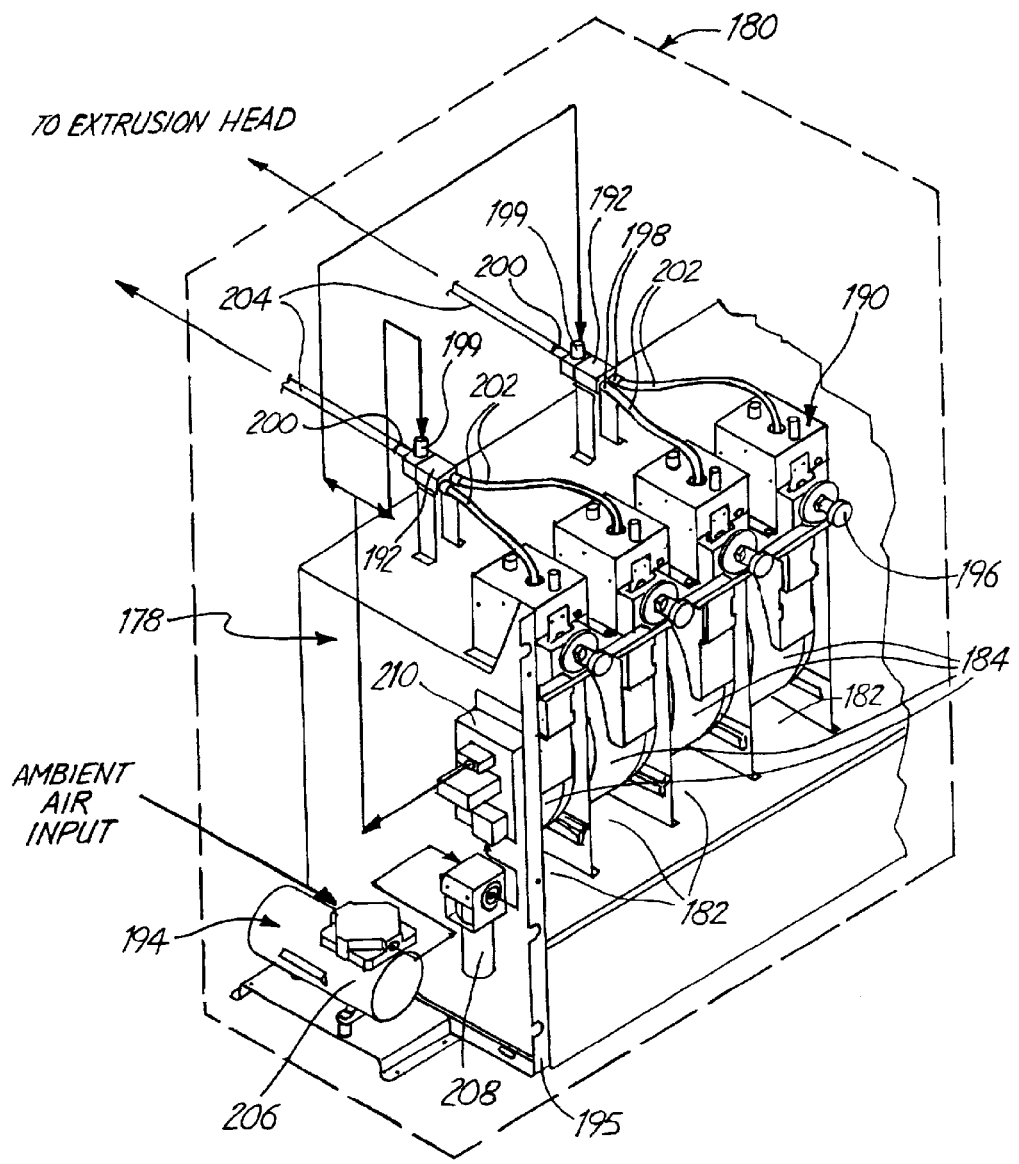
FIG. 13 is a perspective view of a filament loading assembly in a second embodiment of the three-dimensional modeling machine.
Figure 14:
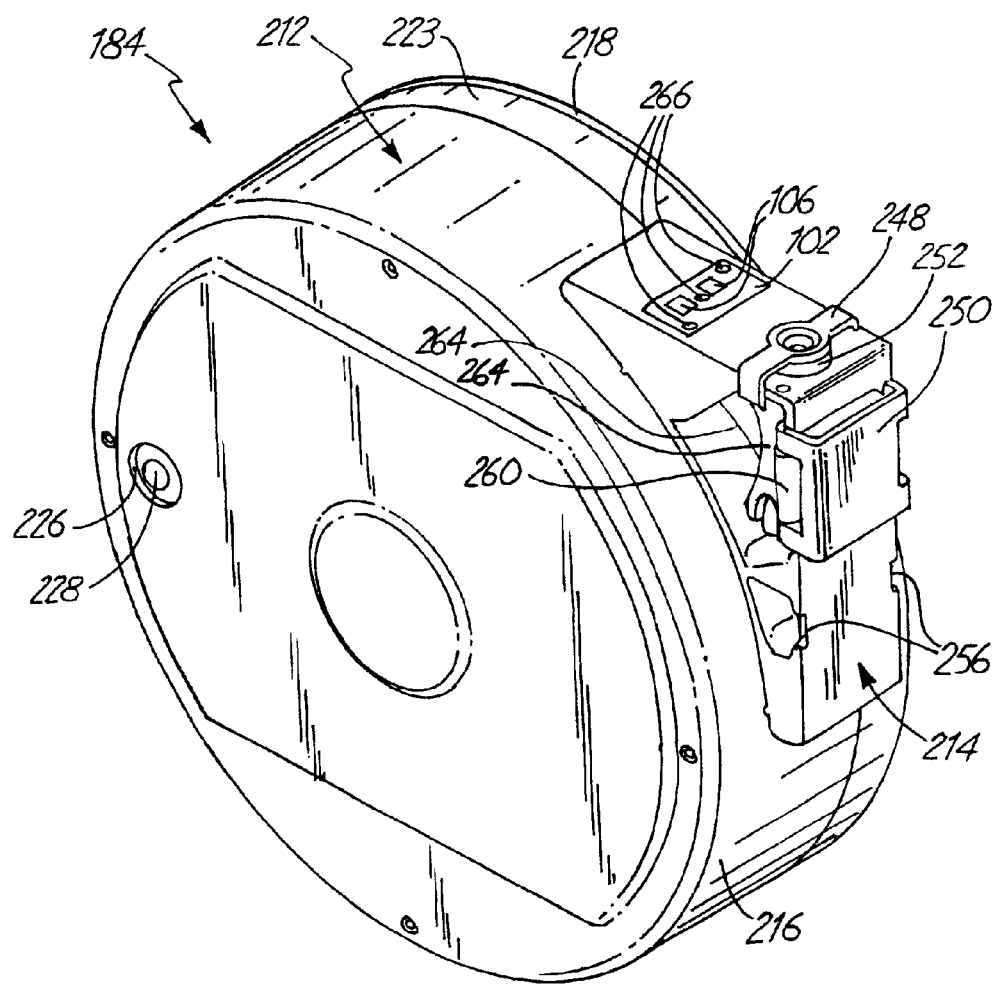
FIG. 14 is a perspective view of a second embodiment of the filament cassette.
Figure 15:
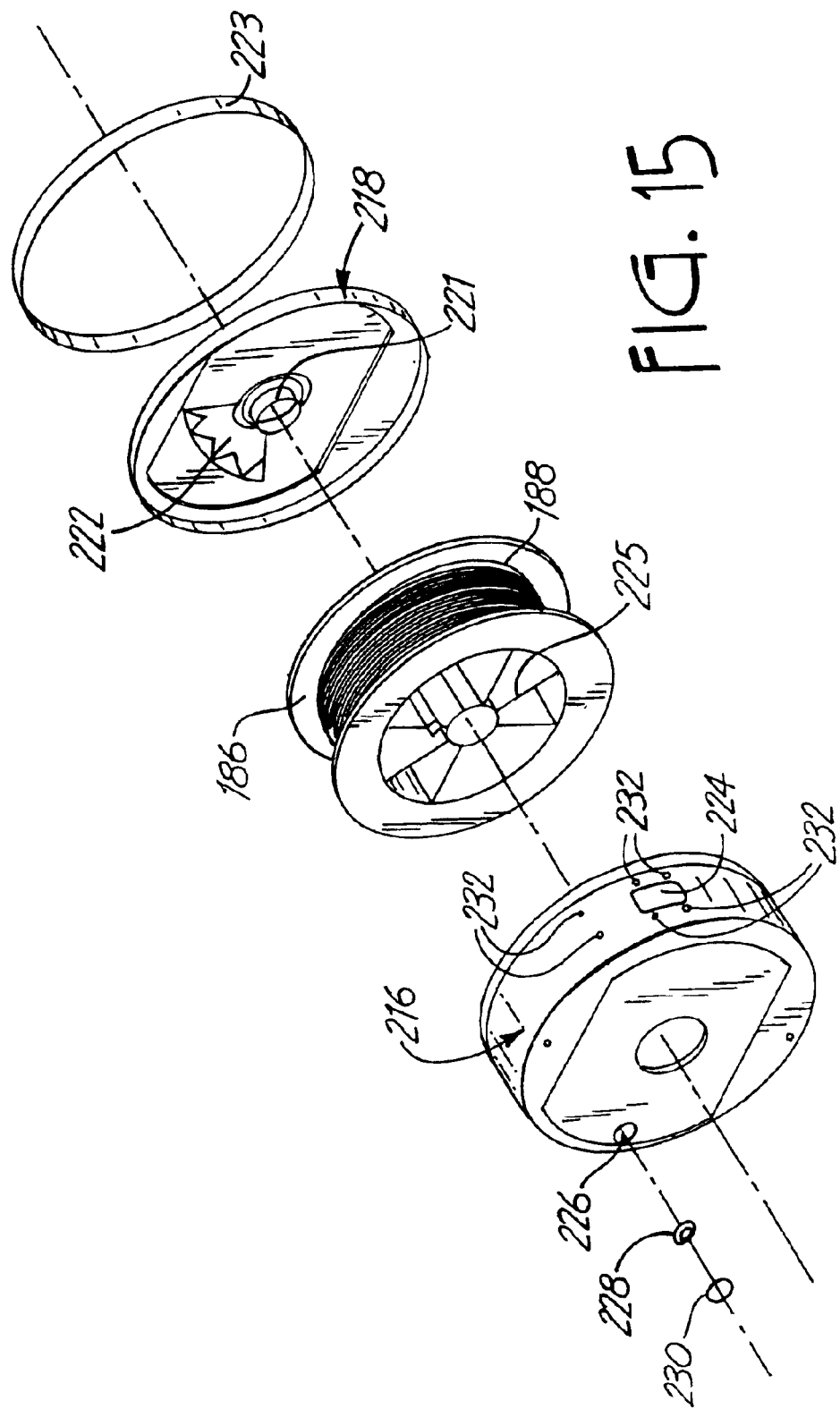
FIG. 15 is an exploded view of the second embodiment of the filament cassette (guide block not shown).
Figure 16:
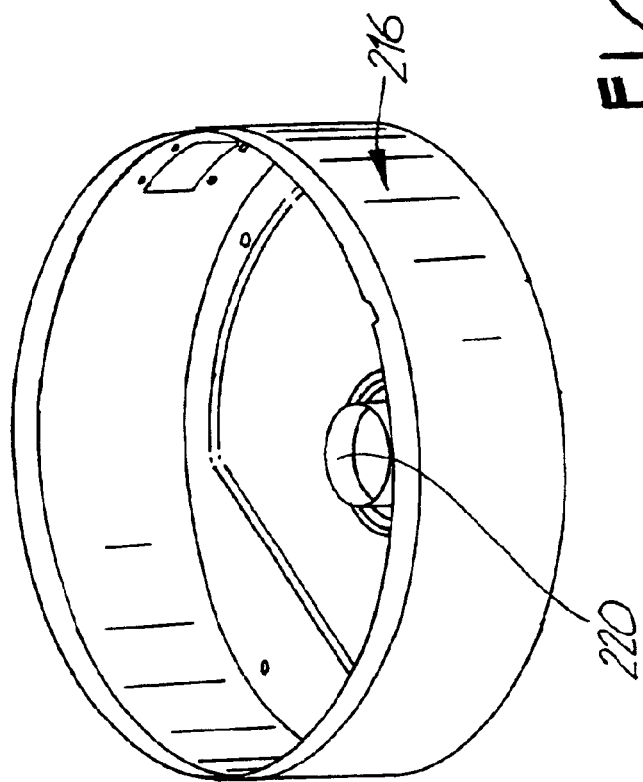
FIG. 16 is a perspective view of the canister base of the second embodiment of the filament cassette.
Figure 17:
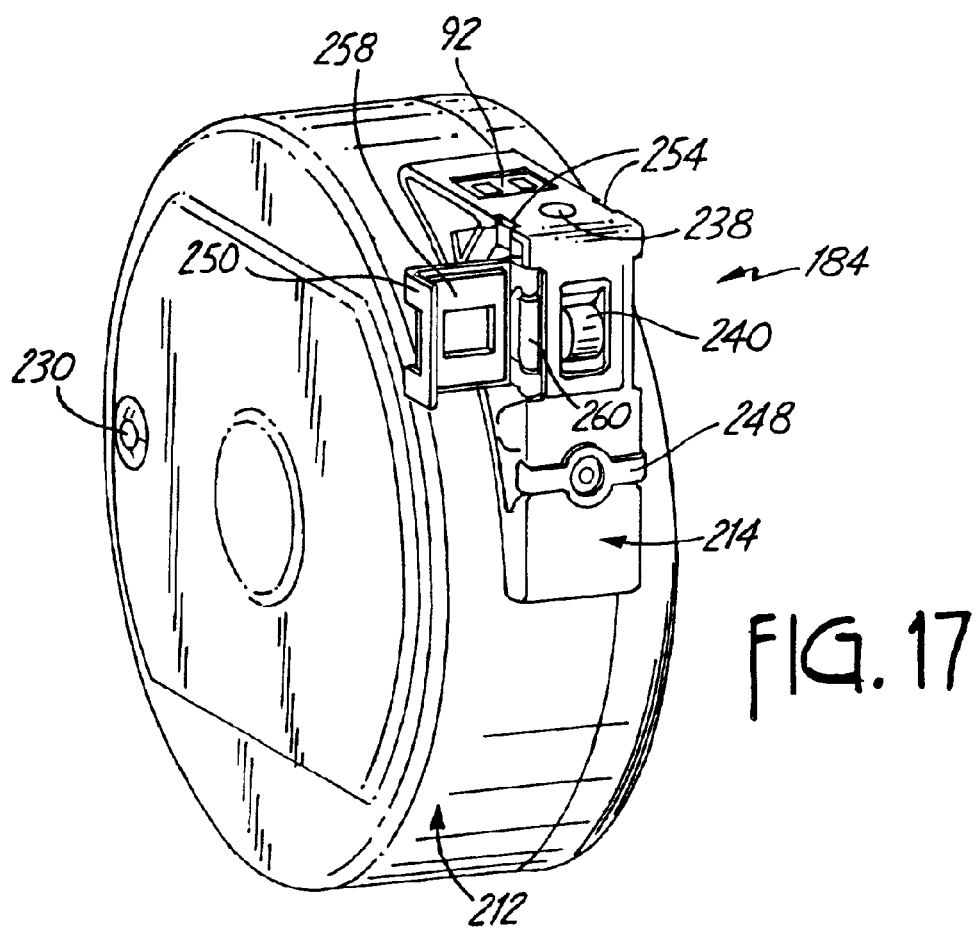
FIG. 17 is a perspective view of the guide block shown in FIG. 14, with the access door open.

FIG. 13 shows a filament loading assembly 178 in a second embodiment of a modeling machine 180, which builds models from filament supplied from a second exemplary embodiment of a filament cassette 184. The filament loading assembly 178 and the filament cassette 184 are particularly suited for building models from moisture-sensitive materials. The filament loading assembly 178 comprises four loading bays 182, four filament cassettes 184 each containing a spool 186 carrying a coil of filament 188, four filament cassette receivers 190, two junction blocks 192 and a drying system 194. The four loading bays 182 are aligned horizontally across the front of the modeling machine 180. Each loading bay 182 receives one filament cassette 184 and has associated with it one filament cassette receiver 190, mounted in a ceiling thereof. The junction blocks 192 are mounted to a frame 195 of the filament loading assembly 178, and are each associated with a pair of cassette receivers 190.

A user loads the filament cassette 184 into the modeling machine 180 by holding the cassette 184 in an upright position, pushing the cassette 184 into one of the loading bays 182, grasping a latch 96 on the filament cassette receiver 190, and pulling the latch 196 forward to drop the filament cassette receiver 190 to a lowered position. In the lowered position, the filament cassette receiver 190 mates with the filament cassette 184 and latches the cassette 184 into place. A strand of filament is manually fed from each filament cassette 184 to the associated cassette receiver 190 (as will be described in detail below). The cassette receiver 190, under control of the controller 25, then automatically advances the filament strand through tubing 202 and the associated junction block 192 toward the extrusion head 20.

Each junction block 192 has two input ports 198, one air port 199, and one output port 200. The input ports 198 are coupled to the associated cassette receivers 190 by lengths of tubing 202, which provides a path for filament strands from the receivers 190 to the associated junction block 192. The output ports 200 of each junction block 192 are connected to lengths of tubing 204. Tubing 204 provides a filament path from each junction block 192 to a liquifier 26 (such as shown in FIG. 1). For filament 188 that is made of a moisture sensitive material, the drying system 194, which comprises a compressor 206, a filter 208, and a regenerative dryer 210, is used to maintain dry conditions in the path of the filament strand as it travels from the cassette 184 to the liquifier 26, as will be described in more detail below.

At a given time, only one strand of filament is provided to each junction block 192 and to each pair of feed rollers 22. The other filament strands remain in the associated cassette receivers 190. A cassette 184 that provides the filament strand to the junction box 192 is termed a primary material supply cassette, while a cassette 184 which provides the filament strand that remains in the cassette receiver 190 is termed a standby material supply cassette. The machine 180 can switch from the primary to the standby material supply cassette 184 without user intervention, by winding the filament strand from the primary cassette 184 back towards its receiver 190, and advancing the filament strand from the standby cassette 184 through the junction block 192 to the feed rollers 22. The standby cassette then becomes the primary cassette. In a typical modeling application, it will be preferable for one junction block 192 to receive modeling) material filament and the other junction block 192 to receive support material filament. Then, the machine 180 can automatically switch to the standby supply when the primary supply is depleted, and no modeling time will be lost. The depleted cassette can be replaced at the user's convenience while the modeling machine 180 continues to run. Alternatively, if the primary and standby cassettes 184 contain different types of filament 188, switching can be done before depletion of material to allow building from a different material type or color.

The filament cassette 184 is shown in detail in FIGS. 14–17. As shown, the filament cassette 184 is comprised of a canister 212, a guide block 214, and spool 186 carrying a coil of the filament 188. The canister 212 is formed of a body 216, and a lid 218 that presses onto the body 216. The interior of canister 212 defines a chamber containing the spool 186. The spool 186 rotates on a hub 220 of the body 216 and a hub 221 of the lid 218. Optionally, a spring plate 222 is attached to the inside of the lid 218. The spring plate 222 has spiked fingers which are bent so as to allow rotation of the spool 186 in only the direction that will advance filament out of the cassette 184. The guide block 214 is attached to the body 216 at an outlet 224, and provides a exit path for the filament 188. The guide block 214 is fastened to the canister body 216 by a set of screws (not shown) which extend through six screw holes 232 in the body 216 (shown in FIG. 15).

For filament 188 made of moisture sensitive material, the cassette 184 is made air tight. The canister 212 and guide block 214 are made of materials that block water vapor transmission, such as sheet metal and polypropylene, respectively. A strip of moisture-impermeable tape 223 seals the lid 218 to the body 216. Moisture can be withdrawn from the interior chamber of canister 212 through a hole 226 in the canister body 216, and the hole 226 sealed with a plug 228. Preferably, a piece of moisture-impermeable tape 230 is placed over the plug 228 to further seal the hole 226.

Figure 19:
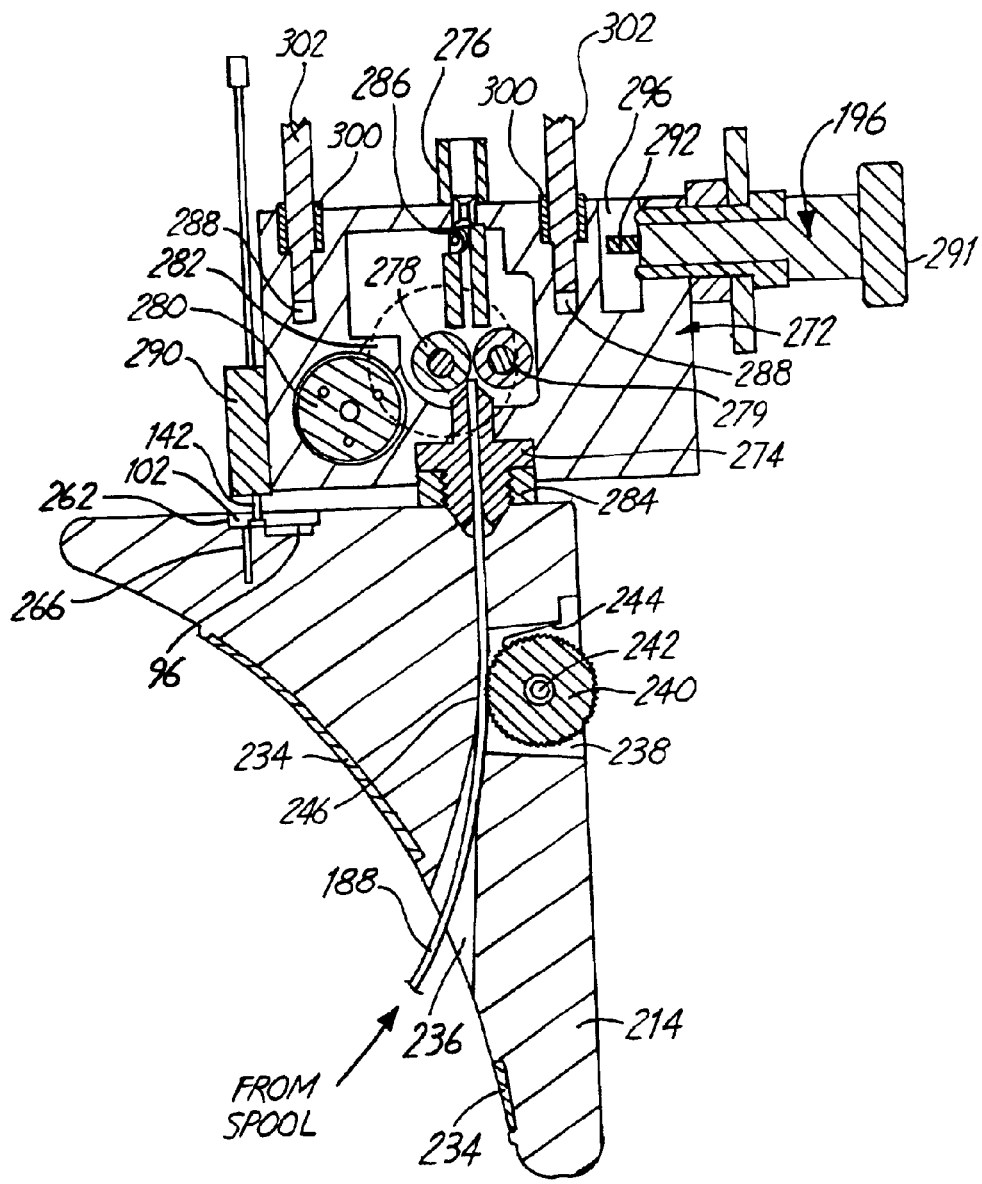
FIG. 19 is a sectional view of the filament loading assembly of FIG. 13, taken along a line 19—19 thereof.

As shown in FIG. 19, a strand of the filament 188 inside the canister 212 is fed through outlet 224 into a filament path 236 in the guide block 214. The filament path 236 extends through the guide block 214, terminating in an exit orifice 238. Adjoining the filament path 236, the guide block 214 has a chamber 238 in which a knurled roller 240 is mounted on a pin 242. The pin 242 is mounted so that the knurled roller 240 pinches the strand of filament in the path 236 against a wall 246. A user can advance the filament strand out of the exit orifice 238 and along the filament path 236 by manually rotating the roller 240 in a clockwise direction. To prevent a counterclockwise rotation of roller 240 (which would push the filament strand towards the canister 212 where it could be accessed only by opening the canister), an anti-rotation plate 244 is preferably mounted in the chamber 238, juxtaposed with the roller 240. It will be apparent to those skilled in the art that the knurled roller 240 could be replaced with some other means for advancing the filament strand. For example, the wall 246 could have a raised contour allowing a user to apply a manual propulsion force to the filament over the contour. Further, the raised counter could be defined by an idler rollers or an idler roller could be used in combination with the knurled roller 240.

For filament 188 formed of moisture sensitive material, air flow to the filament path 236 is prevented. The guide block 214 has a removable plug cap 248 that seals the exit orifice 238, and a door 250 that encloses the chamber 238. The plug cap 248 snap-fits onto a pair of grooves 254 on the guide block 214, so that a compressible seal 252 on the underside of the plug cap 248 covers the exit orifice 238. The plug cap 248 is removed by the user at the time of inserting the cassette 184 into the machine 180. Preferably, the guide block has a second set of grooves 256 on which the plug cap 248 may be parked when it is removed from the first set of grooves 254. The door 250 has a compressible seal 258 on an interior surface thereof, and pivots on a hinge 260. When the door 250 is open, the roller 240 is accessible to a user. The door 250 is opened by a user to load filament into the machine 180, and kept closed otherwise. A compressible seal 234 is placed between the guide block 214 and the canister body 216 to further seal the cassette 184.

The guide block 214 may carry an EEPROM 96 (described with respect to embodiment one above). The circuit board 102 carrying EEPROM 96 is mounted in a depression 262 of the guide block 214, with the pair of electrical contacts 106 facing out and the EEPROM 96 facing in. The circuit 102 is fastened to the guide block 214 by three screws 266. For ease of use, the guide block 214 preferably functions as a handle for the cassette 184. In the embodiment shown, the guide block 214 includes a pair of grips 264 (shown in FIG. 14) on opposite sides thereof.

The filament cassette 184 is assembled by placing the spool 186 carrying the filament 188 on the hub 220 of the body 216, and feeding a filament strand into the guide block 214. The filament strand is positioned along the filament path 236 so that it contacts the roller 240. Optionally, packets of desiccant 62 (such as shown in regards to embodiment one) may be placed in compartments defined by spokes 225 of the spool 186. Then, the lid 218 is pressed onto the body 216, and the tape 223 is applied. It is then ready for use. The cassette 184 may likewise be refilled and reused after the filament 188 that it contains becomes depleted or unusable, by removing the lid 218 of the canister 212 and replacing the filament 188 on the spool 186. When refilling a cassette 184, the EEPROM 96 carried by circuit board 102 can be reset or the circuit board replaced to provide a new EEPROM 96.

For moisture sensitive materials, the cassette 184 containing the spooled filament should be dried to a level at which the moisture content will not impair model quality. For most high-temperature thermoplastics, for example polycarbonate, polyphenylsulfone, polycarbonate/ABS blend and Ultem™, an acceptable moisture content is a level less than 700 parts per million (ppm) water content (as measured using the Karl Fischer method). Multiple techniques may be used to dry the filament.

The material may be dried by placing the cassette 184 containing spooled filament in an oven under vacuum conditions. The cassette 184 is placed in the oven prior to attaching the circuit board 102 and prior to plugging the hole 226. The oven is set to a temperature suitable to the specific modeling material type. For high-temperature thermoplastics, a temperature of between 175–220° F. is typical. The oven has a vacuum pump which maintains a dry environment in the oven. The hole 226 in canister 212 facilitates bringing the chamber of the canister 212 to the oven environment, so that the modeling material will be dried. When the moisture content of the material reaches a level desirable for the modeling material, the hole 226 is promptly sealed and the cassette 184 removed from the oven. For high-temperature thermoplastics, an expected drying time is between 4–8 hours to reach less than 300 ppm water content. The circuit board 102 is then attached. The fully-assembled cassette 184 may be vacuum-sealed in a moisture-impermeable package, until its installation in a machine.

Alternatively, the packets of desiccant 62 alone may be used to dry the material in the chamber of canister 212 without use of the oven. It has been demonstrated that placing packets 62 containing Tri-Sorb-molecular sieve and calcium oxide (CaO) desiccant formulations in the cassette 184 and sealing the cassette 184 in a moisture-impermeable package will dry the material to a water content level of less than 700 ppm, and will dry the material to the preferred range of 100–400 ppm. This desiccant-only drying method has advantages over the oven-drying method in it requires no special equipment, and is faster, cheaper and safer than oven drying. Suitable Tri-Sorb-molecular sieve desiccant formulations include the following: zeolite, NaA; zeolite, KA; zeolite, CaA; zeolite. NaX; and magnesium aluminosilicate.

Modeling filament in the cassette 184 can later be re-dried by oven-drying or by replacing the desiccant packets if the cassette 184 becomes moisture contaminated while a usable amount of filament 188 remains. Moisture contamination may occur, for example, if the access door 250 is left open for a prolonged time period, if the cassette 184 is removed from the machine 180 without replacing the plug cap 248, or it the cassette 184 is opened by a user.

Figure 18:
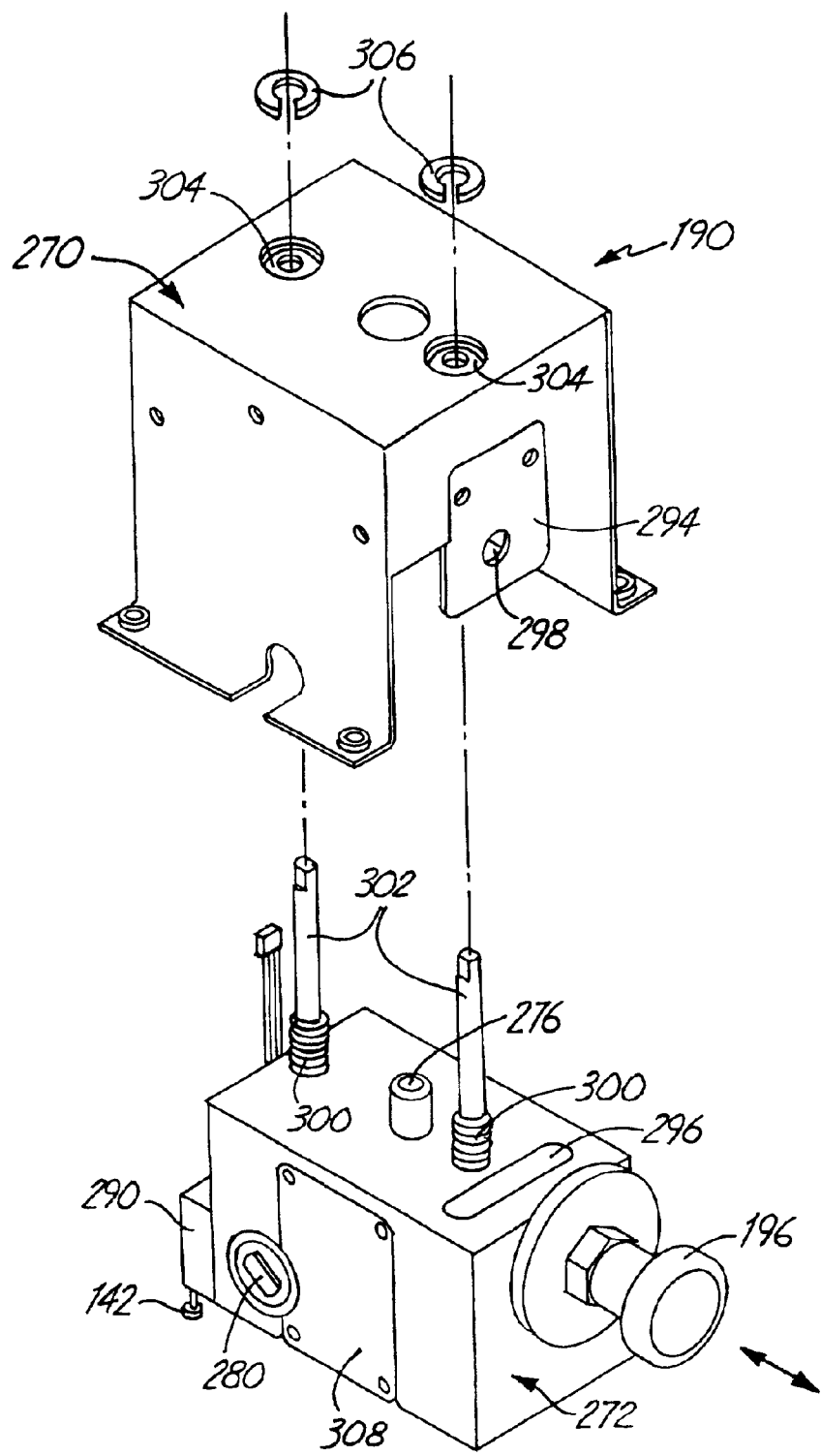
FIG. 18 is an exploded view of the filament cassette receiver shown in FIG. 13.

The filament cassette receiver 190, which engages filament cassette 184, is shown in detail in FIGS. 18 and 19. Each cassette receiver 190 comprises a lift 270 and a drive block 272. As shown in FIG. 19, drive block 272 houses an entry conduit 274, an exit conduit 276, a pair of rollers 278 and 279, a motor 280 and the latch 196. Roller 278 is a drive roller and roller 279 is an idler. The drive roller 278 is driven by the motor 280. The motor 280 is preferably a DC motor with a current supply controlled by the controller 25. Motor 280 extends laterally through the drive block 272 and couples to the drive roller 278 by a drive gear 282 attached to the shaft of the roller 278.

The exit conduit 276 is connected to the tubing 202. The filament strand provided from the guide block 214 passes through the entry conduit 274 to the rollers 278 and 279. The entry conduit 274 mates with the exit orifice 238 of the guide block 214 when the cassette 184 is loaded and latched into modeling machine 180. To provide an airtight path for the filament strand entering the drive block 272, a seal 284 surrounds the entry conduit 274 near the entrance thereof and compresses against the guide block 214 of the loaded cassette 184. From the rollers 278 and 279, the filament strand is provided to the exit conduit 276, and from there to the tubing 202. The tubing 202 makes an airtight seal with the exit conduit 276. Likewise, tubing 202 and tubing 204 make an airtight seal with the ports 198 and 200 of the junction block 192, providing an airtight filament path from the cassette 184 to the feed rollers 22.

The drive roller 278 and idler roller 279 must maintain gripping, frictional contact on the filament strand to advance it along the filament path. To grip the filament strand, the rollers 278 and 279 may be have elastomeric surfaces, or idler roller 279 may be spring-biased towards the drive roller 278, such as is described in U.S. Pat. No. 5,121,329. An advantage of a spring-biased configuration is that the roller surfaces can be hard and more wear resistant. Preferably, the surfaces of rollers 278 and 279 each also have a groove around the circumference thereof to align the filament strand on its course from the entry conduit 274 to the exit conduit 276. The rollers 278 and 279 are accessible to a user for maintenance through cover plate 308.

The drive block 272 also contains a filament sensor 286, which is positioned along the filament path between the roller pair 278 and 279 and the exit conduit 276. Sensor 286 is electrically connected to the controller 25, and provides a signal indicating whether or not filament is present at the position of the sensor 286. In the exemplary embodiment shown, the sensor is a floating, axis microswitch sensor. The drive block 274 further carries an electrical connector 290. The electrical connector 290 has two pogo pins 142 that mate with the electrical contacts 106 of circuit board 102, connecting the EEPROM 96 carried by circuit board 102 to the controller 25. The EEPROM 96, when contacted by the pogo pins 142, signals the controller 25 that the cassette 182 is present. In this manner, the machine 180 knows whether or not each cassette 184 has been loaded.

The drive block 272 is manually raised and lowered by the use of the latch 196. The latch 196 has a handle 291 at one end thereof and a latch pin 292 at the other end thereof. The latch 196 extends through the drive block 272 such that the handle 291 is accessible to a user and the latch pin 292 projects into a vertical slot 296 of the drive block 272. The slot 296 receives a latch plate 294 which extends vertically downward from the lift 270. The latch plate 294 has a hole 298 for receiving the latch pin 292. Pulling on the handle 291 of the latch 196 retracts the latch pin 292, allowing insertion and removal of the pin 292 from the hole 298. When the latch pin 292 is inserted into the hole 298, the drive block 272 is maintained in a raised position, allowing loading and unloading of the cassette 184 from the loading bay 182. When the latch pin 292 is removed from the hole 298, the drive block 272 drops to its lowered position where it engages the cassette 184 in the loading bay 182. A user manually raises or lowers the drive block 272 by grabbing the latch handle 291, pulling forward, and either lifting or lowering the latch 196.

A pair of guide rods 302 are provided on the drive block 272, which couple the drive block 272 to the lift 270, and align the latch plate 294 in the slot 296. The guild rods 302 are mounted in two receptacles 288 on a top surface of the drive block 272. The guide rods 302 extend vertically upward from the drive block 272 and through a pair of guide bearings 304 in the lift 270. A pair of c-clips 306 clip to the guide rods 302 above the lift 270 to support the drive block 272 in its lowered position. Preferably, a pair of springs 300 surround the guide rods 302 in the receptacles 272. In the raised position, the springs 300 compress beneath the lift 270. When the latch 196 is pulled to remove the pin 292 from the hole 298, springs 302 force the drive block 272 to its lowered position.

The drying system 194 creates an active moisture barrier along the filament path, keeping the filament 188 dry while in the machine 18. In the exemplary embodiment, the drying system 194 is a dry-air purge system which provides dry air under pressure into air port 199 of the junction blocks 192. The dry air flows through the tubing 204 and exits the tubing 204 near the liquifier 26. If the feed rollers 22 are used to advance the filament strand into the liquifier 26, the filament will exit the tubing 204 as it enters the feed rollers 22. Alternatively, the feed rollers 22 can be eliminated by using the roller pair 278 and 279 in the drive block 272 to advance filament into the liquifier 26 at a controlled rate. The exit of tubing 204 serves as a vent through which any moisture that may have been trapped along the filament path is released. For instance, the air flow provided by drying system 194 will purge any humid air that enters the drive block 272 during the time that the entry conduit 274 of the drive block 272 is not sealed to a filament cassette 184. Additionally, the positive pressure maintained in the tubing 204 prevents humid air from entering the open end of the tubing 204. By maintaining a positive pressure in the tubing 202 and 204 and purging the filament path of any moisture, the drying system 194 allows use of the modeling machine 180 in a humid environment with moisture sensitive modeling material.

As mentioned above, the drying system 194 of the exemplary embodiment comprises a compressor 206, a filter 208 and a regenerative dryer 210. The compressor 206 intakes ambient air and provides the air under pressure to filter 208. Filter 208 removes water particles from the air. A Norgren™ F72G general purpose filter is suitable for this application. From the filter 208, the air under pressure flows to the dryer 210, which is preferably a regenerative dryer, such as an MDH Series dryer available from Twin Tower Engineering, Inc. of Broomfield, Colo. Dry air under pressure flows from the dryer 210 into each junction block 192. In alternative embodiments of the drying system, any source of dry air under pressure may be utilized successfully to purge moisture from the filament path, and other dry gases may be utilized as well. Importantly, the drying system should continuously feed dry air or other gas under pressure to the filament path, disallowing humid air from remaining in or entering the filament path, and should be vented at or near the end of the filament path. One alternative to drying system 194 is to provide a compressed nitrogen tank as the dry gas source. Another alternative is a regenerative drying system, such as a hot air desiccant dryer having an output of less than or equal to about −40° F. dew point.

To install one of the cassettes 184 into the modeling machine 180, the machine 180 is first turned on. The user then removes the plug cap 248 from the filament cassettes 184, and promptly inserts the cassette 184 into one of the loading bays 182. The plug cap 248 can be parked on the grooves 256 of the guide block 214, saving it for later use. The user latches the cassette 184 into place by pulling on latch 196, as has been described. Once latched, the pogo pins 142 will contact the circuit board 102, thereby connecting the EEPROM 96 to the controller 25. Once the controller 25 senses that the cassette 184 is loaded, the controller 25 will turn on the motor 280. The drive roller 278 will then begin turning.

The user next opens the door 250 of the guide block 214 to access the roller 240, and manually turns roller 240 by exerting a downward force on the roller. The rotation of roller 240 will advance the strand of filament 188 out of the guide block 214 and into the entry conduit 274 of the drive block 272. When the filament strand reaches the already rotating drive roller 278, the roller pair 278 and 279 will grab the filament strand and take over advancement of the strand from the user. The user promptly shuts the door 250 to seal the filament path. The roller pair 278 and 279 then advance the filament strand at least as far as the position of the filament sensor 286. If the filament cassette 184 is to be a standby cassette, the controller 25 will signal the motor 280 to stop turning, so that advancement of the filament strand ceases at the sensor 286. Alternatively, if the cassette 184 is to be a primary cassette, the roller pair 278 and 279 feed the filament strand through the junction block 192 to the feed rollers 22 (or alternatively to the liquifier 26). When the filament strand reaches the feed rollers 22, the feed rollers 22 take over control of the filament strand advancement. If the current on the motor 280 is set low enough and the filament is rigid enough, the motor 280 may be allowed to remain on and continue supplying, a constant push, but will stall out when the feed rollers 22 are not in motion. This arrangement avoids having to turn the motor 280 on and off in synchrony with the operation of the feed rollers 22. In an alternate embodiment, the roller pair 278 and 279 may serve as the material advance mechanism in place of the feed rollers 22. In such a case, the operation of motor 280 would be closely controlled by controller 25 to control advancement filament into the extrusion head 20.

During modeling, the controller 25 can keep track of the amount of filament remaining in each cassette 184 by use of a count maintained by each EEPROM 96. When one of the primary cassettes 184 becomes depleted of filament, the modeling machine 180 will automatically switch to the standby cassette 184 without operator intervention. To unload the filament, the controller 25 drives the motor 24 backwards for a short time sufficient to pull the strand of filament 188 out of the liquifier 26 and feed rollers 22. The controller 25 then drives the motor 280 backwards to pull the filament strand out of the tubing 204, the junction block 192, the tubing 202, and past the sensor 286. The machine 180 knows that the junction block 192 is clear to receive filament from the standby cassette 184 when the sensor 286 of the primary cassette drive block 272 indicates that filament is no longer present. The machine 180 then loads filament from the standby cassette 184 to the extrusion head 20. This auto-unload/reload process is particularly beneficial for modeling of large objects and when the modeling machine 180 is operated beyond business hours. The user can replace the depleted cassette 184 while the machine 180 continues to build a model. The depleted cassette 184 can then be refilled and reused.

In the case that the user desires to remove one of the cassettes 184 from the machine 180 before the cassette 184 is depleted of filament, the user may command the machine 180 to execute the unload process. If a useable amount of filament 188 remains on cassette 184 when it is removed from the modeling machine, the cassette 184 may be stored for later use without contamination. In such a case, the user should seal the exit orifice 238 with the plug cap 248. If the cassette 184 has a useable amount of filament 188 remaining but the filament has been moisture contaminated, the cassette 184 may be re-dried as described above.

As disclosed in U.S. Pat. No. 5,866,058, in building a model from a thermally solidifiable material, it is preferable to build the model in a chamber heated to a temperature higher than the solidification temperature of the modeling material, and to cool the material gradually following deposition so as to relieve stresses from the material. A number of desireable thermoplastic modeling materials have high melting points, for example, polycarbonate, polyphenylsulfone, polycarbonate/ABS blend and Ultem™, and additionally are moisture sensitive. A deposition modeling apparatus which is particularly suitable for building models at a high temperature is disclosed in PCT Application No. US00/17363, which has been incorporated by reference herein. The modeling machine 180 which uses a moisture-sealed material delivery apparatus according to the second embodiment of the present invention may be an apparatus of the type that is a subject of PCT Application No. US00/17363, thereby providing a dry, high temperature modeling environment. Various high-temperature, moisture sensitive thermoplastics have been successfully utilized in such a machine, namely, polycarbonate, polyphenylsulfone, polycarbonate/ABS blend and Ultem™ having a viscosity at the modeling temperature of less than 1200 Pa/sec at a shear rate of $10E^{-1}$ $sec^{-1}$ and having a water content ranging between 100–400 ppm. These materials are stronger than ABS thermoplastic and have suitable thermal properties, melt viscosity, shrink characteristics and adhesion for use in three-dimensional deposition modeling.

Although the present invention has been described with reference to exemplary embodiments, workers skilled in the art will recognize that changes may be made in form and detail without departing from the spirit and scope of the invention. For example, the various features of embodiment 1 may be used and interchanged with the features of embodiment 2, and vice-versa. For example, the drying system of embodiment 2 may be used with the design of embodiment 1, and embodiment 1 may be used to provide primary and standby cassettes as disclosed with respect to embodiment 2. Additionally, it will be apparent to those in the art that the filament cassette and loading system of the present invention may be used to advantage in extrusion applications other than the building of three-dimensional models by a fused deposition process. Other changes may be made as well in keeping with the scope of the invention. As an example, the motor for driving a roller carried by a filament cassette may be carried by the cassette rather than mounted on the modeling machine. These and other changes will be apparent to one skilled in the art.

What is claimed is:

1. A filament cassette for supplying filament to a modeling machine that builds three-dimensional objects by extruding modeling material supplied in the form of a filament and made flowable when heated, comprising:

a dried chamber containing a rotatable spool of coiled filament;

a filament path leading from the chamber to an exit orifice;

means for preventing air flow to the chamber; and a pair of rollers for advancing a filament strand from the spool along the filament path, said rollers being mounted opposite one another along the filament path so as grip the filament strand therebetween, wherein each roller in said pair of rollers is passive and one roller in said pair is a follower roller that is accessible to receive an external drive force, and wherein the follower roller has a floating axis of rotation in a direction perpendicular to the filament path, allowing the follower roller to move away from the filament path in the absence of an external applied force, thereby relieving pressure on a filament strand in the filament path.

2. A filament cassette for supplying filament to a modeling machine that builds three-dimensional objects by extruding modeling material supplied in the form of a filament and made flowable when heated, comprising:

a dried chamber containing a rotatable spool of coiled modeling filament;

a filament path leading from the chamber to an exit orifice;

a means for advancing a filament strand from the spool alone the filament path;

means for preventing air flow to the chamber; and a registration means for mating with a modeling machine so as to align the exit orifice with a filament conduit of the modeling machine.

3. A method for assembling a filament cassette, comprising the steps of:

providing a cassette having a chamber for receiving a spool of coiled filament, a filament path leading from the chamber to an exit orifice, and a roller for advancing a filament strand from the spool along the filament path, said roller being positioned along the filament path so as to grip the filament strand, wherein said roller is accessible to receive an external drive force, and wherein said roller has a floating axis of rotation which allows the roller to move away from the filament path in the absence of an external applied force, to thereby relieve pressure on a filament strand in the filament path;

loading a spool of coiled filament into the chamber of the cassette;

positioning a strand of the filament in the filament path;

drying the chamber and the filament; and sealing the chamber after the filament is loaded.

4. The method of claim 3, wherein the drying step comprises placing a supply of desiccant in the chamber.

5. The method of claim 3, wherein the drying step comprises heating the filament cassette in an oven under vacuum conditions after the filament is loaded into the chamber and before performing the step of sealing.

6. The method of claim 3, wherein the filament is formed of a high-temperature thermoplastic.

7. The method of claim 3, wherein the filament is dried to a water content of less than 700 parts per million.

8. A filament cassette comprising:

a chamber containing a rotatable spool of coiled filament;

a filament path leading from the chamber to an exit orifice; and a pair of rollers for advancing a filament strand from the spool along the filament path, said rollers being mounted opposite one another along the filament path so as to grip the filament strand therebetween, wherein each roller in said pair of rollers is passive and one roller in said pair is a follower roller that is accessible to receive an external drive force, and wherein the follower roller has a floating axis of rotation which allows the follower roller to move away from the filament path in the absence of an external applied force, thereby relieving pressure on a filament strand in the filament path.

9. The filament cassette of claim 8, and further comprising:

means for preventing air flow to the chamber.

10. The filament cassette of claim 9, wherein the chamber and the coiled filament are dried to a water content of less than 700 parts per million.

11. The filament cassette of claim 9, wherein the means for preventing air flow comprises:

a door through which the follower roller is accessed.

12. The filament cassette of claim 9, and further comprising:

a supply of desiccant inside of the chamber.

13. A filament cassette comprising:

a chamber containing a rotatable spool of coiled filament;

a filament path leading from the chamber to an exit orifice; and a roller for advancing a filament strand from the spool along the filament path, said roller being positioned along the filament path so as to grip the filament strand, wherein said roller is accessible to receive an external drive force, and wherein said roller has a floating axis of rotation which allows the roller to move away from the filament path in the absence of an external applied force, thereby relieving pressure on a filament strand in the filament path.

14. The filament cassette of claim 13, and further comprising:

means for preventing air flow to the chamber.

15. The filament cassette of claim 14, wherein the chamber and the coiled filament are dried to a water content of less than 700 parts per million.

16. The filament cassette of claim 14, wherein the means for preventing air flow comprises:

a door through which the roller is accessed.

17. The filament cassette of claim 14, and farther comprising:

a supply of desiccant inside of the chamber.

18. A filament cassette for supplying filament to a modeling machine, comprising:

a chamber containing a rotatable spool of coiled modeling filament;

a filament path leading from the chamber to an exit orifice;

a means for advancing a filament strand from the spool along the filament path; and a means for mating with a modeling machine so as to align the exit orifice with a filament conduit of the modeling machine.

19. The filament cassette of claim 18, and further comprising:

means for preventing air flow to the chamber.

20. The filament cassette of claim 18, wherein the means for preventing air flow comprises:

a door through which the follower roller is accessed.

21. A method for assembling a filament cassette, comprising the steps of:

providing a cassette having a chamber for receiving a spool of coiled filament, a filament path leading from the chamber to an exit orifice, a means for advancing a filament strand from the spool along the filament path, and a means for mating with a modeling machine so as to align the exit orifice with a filament conduit of the modeling machine;

loading a spool of coiled modeling filament into the chamber of the cassette;

drying the chamber and the filament; and sealing the chamber after the filament is loaded.

22. The method of claim 21, wherein the drying step comprises placing a supply of desiccant in the chamber.

23. The method of claim 21, wherein the drying step comprises heating the filament cassette in an oven under vacuum conditions after the filament is loaded into the chamber and before performing the step of sealing.

24. The method of claim 21, wherein the filament is formed of a high-temperature thermoplastic.

25. The method of claim 21, wherein the filament is dried to a water content of less than 700 parts per million.

26. The method of claim 21, and further comprising the step of positioning a strand of the filament in the filament path, in operable association with the means for advancing.

* * * * *

UNITED STATES PATENT AND TRADEMARK OFFICE
CERTIFICATE OF CORRECTION

PATENT NO. : 6,776,602 B2
APPLICATION NO. : 09/804401
DATED : August 17, 2004
INVENTOR(S) : William J. Swanson et al.

It is certified that error appears in the above-identified patent and that said Letters Patent is hereby corrected as shown below:

Title Page, (56) References Cited, U.S. PATENT DOCUMENTS, insert the following references:

| | | |
|---|---|---|
| 3,016,451 | 1-1962 | Cornell |
| 3,381,812 | 5-1968 | Cohen |
| 3,841,000 | 10-1974 | Simon |
| 3,917,090 | 11-4-1975 | Montagnino |
| 4,844,373 | 7-1989 | Fike |
| 4,898,314 | 2-1990 | Stroh |
| 4,928,897 | 5-1990 | Satou et al |
| 5,169,081 | 12-08-1992 | Göedderz |
| 5,263,585 | 11-1993 | Lawhon et al. |
| 5,293,996 | 3-1994 | Duncan |
| 5,765,740 | 6-16-1998 | Ferguson |
| 5,939,008 | 8-17-1999 | Comb, et al. |
| 6,027,068 | 2-22-2000 | Lantsman |
| 6,095,323 | 8-2000 | Ferguson |
| 6,257,517 | 7-2001 | Babish et al |

Title Page (56)
OTHER PUBLICATIONS, insert

-- "High Temperature Fused Deposition Modelling: An Experimental Study Focusing on Modelling Material", by F.K. Feenstra, from Time-Compression Technologies '98 Conference (October 13-14, 1998, Nottingham, U.K.) --

UNITED STATES PATENT AND TRADEMARK OFFICE
CERTIFICATE OF CORRECTION

PATENT NO. : 6,776,602 B2
APPLICATION NO. : 09/804401
DATED : August 17, 2004
INVENTOR(S) : William J. Swanson et al.

It is certified that error appears in the above-identified patent and that said Letters Patent is hereby corrected as shown below:

Col. 6,
Line 24, delete "tower shell 52", insert -- lower shell 52 --

Col. 9,
Line 42, delete "gear trial 154", insert -- gear train 154 --

Col. 10,
Line 28, delete "conduit 140", insert -- conduit 140, --

Col. 11,
Line 31, delete "a latch 96", insert -- a latch 196 --

Col. 12,
Line 4, delete "modeling)", insert -- modeling --

Col. 14,
Line 17, delete "zeolite.", insert -- zeolite, --

Col. 15,
Line 42, delete "c-clips", insert -- e-clips --

UNITED STATES PATENT AND TRADEMARK OFFICE
CERTIFICATE OF CORRECTION

PATENT NO. : 6,776,602 B2
APPLICATION NO. : 09/804401
DATED : August 17, 2004
INVENTOR(S) : William J. Swanson et al.

It is certified that error appears in the above-identified patent and that said Letters Patent is hereby corrected as shown below:

<u>Col. 18,</u>
Line 57, delete "alone", insert -- along --

<u>Col. 20,</u>
Line 14, delete "farther", insert -- further --

Signed and Sealed this

Nineteenth Day of February, 2008

JON W. DUDAS
*Director of the United States Patent and Trademark Office*